US007034293B2

(12) United States Patent
Wells

(10) Patent No.: US 7,034,293 B2
(45) Date of Patent: Apr. 25, 2006

(54) LINEAR ION TRAP APPARATUS AND METHOD UTILIZING AN ASYMMETRICAL TRAPPING FIELD

(75) Inventor: Gregory J. Wells, Fairfield, CA (US)

(73) Assignee: Varian, Inc., Palo Alto, CA (US)

( * ) Notice: Subject to any disclaimer, the term of this patent is extended or adjusted under 35 U.S.C. 154(b) by 17 days.

(21) Appl. No.: 10/855,760

(22) Filed: May 26, 2004

(65) Prior Publication Data

US 2005/0263696 A1 Dec. 1, 2005

(51) Int. Cl.
*B01D 59/44* (2006.01)

(52) U.S. Cl. ....................... 250/292; 250/293; 250/297

(58) Field of Classification Search ................ 250/292, 250/293, 297

See application file for complete search history.

(56) References Cited

U.S. PATENT DOCUMENTS 2,939,952 A 6/1960 Paul et al.
3,065,640 A 11/1962 Langmuir et al.
4,540,884 A 9/1985 Stafford et al.
4,736,101 A 4/1988 Syka et al.
4,755,670 A 7/1988 Syka et al.
4,882,484 A 11/1989 Franzen et al.
4,975,577 A 12/1990 Franzen et al.
5,028,777 A 7/1991 Franzen et al.
5,170,054 A 12/1992 Franzen
5,291,017 A 3/1994 Wang et al.
5,381,007 A 1/1995 Kelley
5,420,425 A 5/1995 Bier et al.
5,436,445 A 7/1995 Kelley et al.
5,468,957 A 11/1995 Franzen
5,576,540 A * 11/1996 Jolliffe ....................... 250/292
5,696,376 A * 12/1997 Doroshenko et al. ....... 250/292
5,714,755 A 2/1998 Wells et al.
6,177,668 B1 * 1/2001 Hager ........................ 250/282
6,642,514 B1 * 11/2003 Bateman et al. ............ 250/288
6,730,904 B1 * 5/2004 Wells ......................... 250/292
6,831,275 B1 * 12/2004 Franzen et al. ............. 250/292
2004/0222369 A1 * 11/2004 Makarov et al. ............ 250/281

(Continued)

OTHER PUBLICATIONS

Book by March, et al., entitled "Quadrupole Storage Mass Spectrometry", published by John Wiley & Sons, (1991).

(Continued)

*Primary Examiner*—Nikita Wells
*Assistant Examiner*—Anthony Quash
(74) *Attorney, Agent, or Firm*—Bella Fishman; David Gloekler

(57) ABSTRACT

A linear ion trap includes four electrodes and operates with an asymmetrical trapping field in which the center of the trapping field is displaced from a geometrical center of the trap structure. The asymmetrical trapping field can include a main AC potential providing a quadrupole component and an additional AC potential. The main AC potential is applied between opposing pairs of electrodes and the additional AC potential is applied across one pair of electrodes. The additional AC potential can add a dipole component for rendering the trapping field asymmetrical. The additional AC potential can also add a hexapole component used for nonlinear resonance. A supplementary AC potential can be applied across the same pair of electrodes as the additional AC potential to enhance resonant excitation. The operating point for ejection can be set such that a pure resonance condition can be used to increase the amplitude of ion oscillation preferentially in one direction. Ions trapped in the composite field can be mass-selectively ejected in a single direction to an aperture in one of the electrodes.

33 Claims, 23 Drawing Sheets

U.S. PATENT DOCUMENTS

2004/0245455 A1* 12/2004 Reinhold .................... 250/288

OTHER PUBLICATIONS

Article by KB Jefferts, entitled "Rotational Hfs Spectra of H2+ Molecular Ions" published in Physical Review Letters, vol. 20, No. 2, Jan. 8, 1968.
Article by ES Ensberg, et al., entitled "The Visible Photodissociation Spectrum of Ionized Methane", published in The Astrophysical Journal, 195; pp. L89-L91, Jan. 15, 1975.
Article by Fulford, et al., entitled "A New Mode of Operation for the Three-Dimensional Quadrupole Ion Store (Quistor): The Selective Ion Reactor" published in International Journal of Mass Spectrometry and Ion Physics, 26, (1978), pp. 155-162.
Article by Fulford, et al., entitled "Radio-Frequency Mass Selective Excitation and Resonant Ejection of Ions in a Three-dimensional Quadrupole Ion Trap" published by J. Vac. Sci. Technol., 17(4), Jul./Aug. 1980, pp. 829-835.
Article by Alfred, et al., entitled "Resonance Excitation of Ions Stored in a Quadrupole Ion Trap" published by International Journal of Mass Spectrometry and Ion Processes 125 (1993) 171-185.
Book edited by March, et al., entitled "Practical Aspects of Ion Trap Mass Spectrometry" CRC Press (1995).
Article by Louris, et al., entitled "The Paul Ion Trap Mass Selective Instability Scan: Trap Geometry and Resolution" published in the Proceedings of the 40th ASMS Conference on Mass Spectrometry and Allied Topics (1992), pp. 1003-1004.
Article by DA Church entitled "Storage-Ring Ion Trap Derived from the Linear Quadrupole Radio-Frequency Mass Filter", published in the Journal of Applied Physics, vol. 40 No. 8, (1969), pp. 3127-3134.
Article by Dolnikowski, et al., entitled "Ion-Trapping Technique for Ion/Molecule Reaction Studies in the Center Quadrupole of a Triple Quadrupole Mass Spectrometer", published in the International Journal of Mass Spectrometery and Ion Processes, 82 (1988) pp. 1-15.
Article by Barbier, et al., entitled "Study of Two-Dimensional Non-Linear Oscillations by Means of an Electromechanical Analogue Model, Applied to Particle Motion in Circular Accelerators" published CERN Technical Report (1958), 58-5.
Book by Herbert Goldstein Ph.D, entitled "Classical Mechanics" published by Addison-Wesley (1965).
Article by Yang Wang, entitled "Non-Linear Resonance Conditions and Their Relationships to Higher Multipole Fields in Ion Traps and Quadrupole Mass Filters" published Rapid Communications in Mass Spectrometry, vol. 7, pp. 920-928 (1993).

* cited by examiner

LINEAR ION TRAP APPARATUS AND METHOD UTILIZING AN ASYMMETRICAL TRAPPING FIELD

FIELD OF THE INVENTION

The present invention relates generally to a linear ion trap apparatus and methods for its operation. More particularly, the present invention relates to a linear ion trap apparatus and method for providing an asymmetrical electrical field for trapping ions, in which the center of the trapping field is displaced from the geometric center of the apparatus.

BACKGROUND OF THE INVENTION

Ion traps have been employed for a number of different applications in which control over the motions of ions is desired. In particular, ion traps have been utilized as mass analyzers or sorters in mass spectrometry (MS) systems. The ion trap of an ion trap-based mass analyzer may be formed by electric and/or magnetic fields. The present disclosure is primarily directed to ion traps formed solely by electric fields without magnetic fields.

Insofar as the present disclosure is concerned, MS systems are generally known and need not be described in detail. Briefly, a typical MS system includes a sample inlet system, an ion source, a mass analyzer, an ion detector, a signal processor, and readout/display means. Additionally, the modern MS system includes a computer for controlling the functions of one or more components of the MS system, storing information produced by the MS system, providing libraries of molecular data useful for analysis, and the like. The MS system also includes a vacuum system to enclose the mass analyzer in a controlled, evacuated environment. Depending on design, all or part of the sample inlet system, ion source and ion detector may also be enclosed in the evacuated environment.

In operation, the sample inlet system introduces a small amount of sample material to the ion source, which may be integrated with the sample inlet system depending on design. The ion source converts components of the sample material into a gaseous stream of positive or negative ions. The ions are then accelerated into the mass analyzer. The mass analyzer separates the ions according to their respective mass-to-charge ratios. The term "mass-to-charge" is often expressed as m/z or m/e, or simply "mass" given that the charge z or e often has a value of 1. Many mass analyzers are capable of distinguishing between very minute differences in m/z ratio among the ions being analyzed. The mass analyzer produces a flux of ions resolved according to m/z ratio that is collected at the ion detector. The ion detector functions as a transducer, converting the mass-discriminated ionic information into electrical signals suitable for processing/conditioning by the signal processor, storage in memory, and presentation by the readout/display means. A typical output of the readout/display means is a mass spectrum, such as a series of peaks indicative of the relative abundances of ions at detected m/z values, from which a trained analyst can obtain information regarding the sample material processed by the MS system.

Referring to FIG. 1, most conventional ion traps are produced by a three-dimensional electric field using a three-dimensional ion trap electrode assembly 10. This type of electrode structure was disclosed as early as 1960 in U.S. Pat. No. 2,939,952 to Paul et al. As indicated by the arrow in FIG. 1, this electrode assembly 10 is rotationally symmetrical about the z-axis. The electrode assembly 10 is constructed from a top electrode or end cap 12, a bottom electrode or end cap 14, and a center electrode or ring 16, which are formed by hyperboloids of revolution. Top and bottom electrodes 12 and 14 can include respective apertures 12A and 14A, one serving as an entrance aperture for conducting ions into the trap and the other serving as an exit aperture for ejecting ions from the trap, or both serving as exit apertures. As an alternative to using an external ionization device and injecting ions into the electrode assembly 10, ionization can be carried out within the electrode structure by any known means such as directing an electron beam through one of apertures 12A or 14A into the interior of electrode assembly 10.

An alternating (AC) voltage, which generally must have an RF frequency, is typically applied to ring 16 to create a potential difference between ring 16 and end caps 12 and 14. This AC potential forms a three-dimensional quadrupolar trapping field that imparts a three-dimensional restoring force directed towards the center of electrode assembly 10. The AC voltage is adjustable, and thus the trapping field is electrodynamic and well-suited for mass scanning operations. Ions are confined within an electrodynamic quadrupole field when their trajectories are bounded in both the r and z directions. The ion motion in the trapping field is nearly periodic. In a pure quadrupole trapping field, the ion motions in both the r and z directions are independent of each other. Accordingly, the equations of motion for a single ion in the trapping field can be resolved into a pure r motion and a pure z motion that have identical mathematical forms described by the well known Mathieu equation, which can be expressed in various forms. See, e.g., March et al., *Quadrupole Storage Mass Spectrometry*, Wiley, New York (1991).

The Mathieu equation for the axial motion depends on two parameters $a_z$ and $q_z$, often termed trapping, scanning, or Mathieu parameters, which characterize the solutions in the z-axis direction. Similar parameters, $a_r$ and $q_r$ exist for the r-axis motions. These parameters define a two-dimensional region in ($a_u$, $q_u$) space for the coordinate u (r or z) in which the ion motions are bounded and therefore stable. An ion lying outside of a stability region is unstable, in which case the displacement of the ion grows without bounds and the ion is ejected from the trapping field; that is, the parameters of the trapping field for this particular ion are such that the ion cannot be trapped. A graphical representation or mapping of ($a_u$, $q_u$) space for radial and axial stable and unstable ion motion is known as a stability diagram. A point in ($a_u$, $q_u$) space defines the operating point for an ion. The parameters $a_u$ and $q_u$ depend on the m/z ratio of the ion, the spacing of the electrode structure relative to the center of the internal volume it defines, and the frequency of the AC trapping potential. In addition, the parameter $a_u$ depends on the amplitude of the DC component (if present) of the trapping field, and the parameter $q_u$ depends on the amplitude of the AC component. Therefore, for a given electrode arrangement the magnitude and frequency of the AC trapping potential can be set so that only ions of a desired m/z range of interest are stable and thus trappable. For small values of $a_u$, and $q_u$, the pseudo-harmonic motion of an ion can be characterized by the dominant fundamental frequency for motion in the u coordinate, simplifying mathematical treatment of the ion motion.

Various techniques have been utilized for increasing ion oscillations and ejecting ions from a three-dimensional ion trap such as illustrated in FIG. 1, usually for the purpose of detecting the ions as part of a mass spectrometry experiment.

A three-dimensional quadrupole ion trap was employed to distinguish ions of different mass-to-charge ratios formed by photo-dissociation inside of the trap, as reported by K. B. Jefferts, *Physical Review Letters,* 20 (1968) 39. The trapping field frequency was swept and ions of successive mass-to-charge ratios were made unstable in the axial direction and were sequentially ejected from the trap and detected by an electron multiplier. U.S. Pat. No. 4,540,884 to Stafford et al. discloses a similar technique of mass-selective instability scanning. In this patent, ions of an m/z range of interest are trapped in a quadrupole field. The amplitude of the RF voltage is then increased such that ions of increasing m/z values become unstable. Unstable ions are ejected from the trapping field and detected to provide a mass spectrum. Disadvantages of the mass-selective instability scanning technique have been noted, for example, in U.S. Pat. No. 4,882,484 to Franzen et al. First, the direction of ion ejection cannot be adequately controlled or focused. If a perforation is provided in an electrode of three-dimensional trap structure 10 to pass ejected ions to a detector, only a small percentage of ions ejected by mass-selective instability will actually be directed through the perforation. Second, the nature of the quadrupole trapping field is such that the field strength is zero at the center. Hence, ions at or near the center of the field cannot be ejected unless some additional influence is introduced into the system.

In another technique, the amplitude of the ion motion in the radial or axial direction can be increased by the application of a supplemental AC field having a frequency and symmetry that is in resonance with one of the frequencies of the ion motion. If the amplitude of the ion motion is increased enough, the ion will be driven to the surface of an electrode. If a hole exists in the electrode where the ion is directed, such as aperture 12A or 14A in FIG. 1, the ion will escape the trapping field altogether and exit the trap. Dipolar resonant excitation was used to eject ions from the three-dimensional trap to an external detector by applying an axial resonant field to end caps 12 and 14, as reported by Ensberg et al., *The Astrophysical Journal,* 195 (1975) L89. The frequency of the applied field was swept and ions of successive mass-to-charge ratios were ejected from the trap. A variant of these methods is used in commercial ion trap mass spectrometers to eject ions by dipolar resonant excitation. The amplitude of the RF trapping field is increased linearly to increase the operating point ($q_z$, $a_z$) of the ions until the fundamental frequency of ion motion comes into resonance with a supplementary AC voltage on end caps 12 and 14 and resonant ejection occurs. It has also been demonstrated that dipolar resonant excitation can be effected to eject unwanted ions from a three-dimensional quadrupole ion trap formed from hyperboloids of revolution having two sheets. See Fulford et al., *Int. J. Mass Spectrom. Ion Phys.,* 26 (1978) 155; and Fulford et al., *J. Vac. Sci. Technology,* 17 (1980) 829. In these studies, a supplementary AC voltage was applied to end caps 12 and 14 of the ion trap, out of phase, to produce an AC dipole field in the axial direction. As noted, resonant ejection occurs only for those ions having an axial frequency of motion (or secular frequency) equal to the frequency of the supplementary AC field. The ions in resonance with the supplementary field increase the amplitude of their axial oscillation until the kinetic energy of the ions exceeds the restoring force of the RF trapping field and ion ejection occurs in the axial direction. Ejection using a supplemental AC dipole was extended to the tandem (MS/MS) mode of mass spectrometry in U.S. Pat. No. 4,736,101 to Syka et al.

U.S. Pat. No. 4,882,484 to Franzen et al discloses a mass-selective resonance ejection technique that addresses the zero-field strength problem attending quadrupole trapping fields. An RF excitation potential is applied across end caps 12 and 14. If the z-direction secular frequency of an ion matches the frequency of the excitation voltage, the ion absorbs energy from the excitation field and the amplitude of ion motion in z-direction increases until the ion is ejected to one of end caps 12 or 14. This technique can be used to eject ions of consecutive m/z values by either scanning the excitation frequency while holding the quadrupole trapping field constant or scanning the amplitude of the trapping field while holding the excitation frequency constant. Franzen et al further proposed to provide a mechanically or geometrically "non-ideal" ion trap structure to deliberately introduce field faults that result in a nonlinear resonance condition. Specifically, ring 16 or end caps 12 and 14 are shaped to depart from the ideal hyperbolic curvature, thereby introducing an octopole component in the trapping field. In this manner, ion excursions can be compressed along the z-axis to enhance ejection to an aperture 12A or 14A aligned with the z-axis at the apex of an end cap 12 or 14. Nonetheless, this technique fails to eject all ions in a single desired direction. In addition, the mechanical solution can add to the cost, complexity, and precision of the manufacturing process. Moreover, the octopole field is mechanically fixed; its parameters cannot be changed.

Ion ejection by quadrupolar resonant excitation can be effected by the application of a supplementary AC voltage applied in phase to the end cap electrodes. Parametric resonant excitation by a supplemental quadrupole field causes ion amplitudes to increase in the axial direction if the ion frequency is one-half of the supplementary quadrupole frequency. Parametric resonant excitation has been investigated theoretically. See U.S. Pat. No. 3,065,640 to Langmuir et al.; and Alfred et al., *Int. J. Mass Spectrom. Ion Processes.,* 125 (1993) 171. While a supplemental dipole field excites ions to oscillate with an amplitude that increases linearly with time, a supplemental quadrupole field causes an exponential increase in the amplitude of the oscillations. See U.S. Pat. No. 5,436,445 to Kelley et al. However, as in the case of the main quadrupole trapping field, the supplemental quadrupole field has a value of zero at the center of the ion trap. When a buffer gas such as helium is used to dampen the ion trajectories to the center of the trap, parametric excitation is ineffectual due to the vanishing strength of the supplemental quadrupole field. It is necessary to displace the ions from the center of the supplemental quadrupole field to a location where the field has a non-zero value in order to have a finite excitation force applied to the ions.

As described in U.S. Pat. No. 5,381,007 to Kelly, a weak resonant dipole field having a frequency of one-half of the parametric frequency can be used to displace ions from the center of the trap when the operating point of the ions is changed to bring the ion fundamental frequency into resonance with the dipole field. Because the parametric frequency is twice the dipole frequency, the ion will absorb power from the supplemental quadrupole field. This mode of ion ejection, in which power is absorbed sequentially from the dipole and then the quadrupole field, is adequate for ion ejection in a static trapping field where the fundamental frequency of the ion motion is not changing due to the amplitude of the RF field. This mode of ion ejection is not optimal, however, when the trapping field amplitude is changing as is normally the case for mass scanning. In this case, the RF trapping field amplitude is increased to increase the fundamental frequency of the ion motion, bringing it into resonance first with the dipole field. The dipole field displaces the ion from the center of the trap where the quadrupole field is zero. After the ion has been displaced from the center, it can then absorb power from the supplemental quadrupole field if it is in resonance with the parametric resonance. Therefore, it is necessary to fix the dipole resonant frequency at a value less than one-half of the parametric resonance so that as the fundamental frequency of the ion motion is increased by increasing the trapping field RF amplitude, the ion motion will sequentially be in resonance with the dipole field and then with the quadrupole field. See U.S. Pat. No. 5,468,957 to Franzen.

As previously noted, the geometry of the electrode structure of three-dimensional ion trap 10 can be modified to deliberately introduce a fourth-order octopole component into the trapping field to enhance mass resolution, as described for example by Franzen et al., *Practical Aspects of Ion Trap Mass Spectrometry*, CRC Press (1995). Higher-order fields can be obtained by increasing the separation between end caps 12 and 14 while maintaining ideal hyperbolic surfaces. See Louris et al., *Proceedings of the 40th ASMS Conference on Mass Spectrometry and Allied Topics*, (1992) 1003. These surfaces have asymptotes at 35.26° with respect to the symmetric radial plane of the ideal ion trap. Alternatively, the surfaces of end caps 12 and 14 can be shaped with an angle of 35.96° while maintaining the ideal separation between end caps 12 and 14. See, e.g., U.S. Pat. No. 4,975,577 to Franzen et al.; U.S. Pat. No. 5,028,777 to Franzen et al.; and U.S. Pat. No. 5,170,054 to Franzen. For either geometry the trapping field is symmetric with respect to the radial plane.

A disadvantage of the foregoing prior art techniques is that even if ion movement can be concentrated along a single axis to improve scanning the ions out from the trapping field, the ions are nevertheless equally likely to be ejected in either direction along the axis. Thus, only half of the ejected ions may actually reach a detector. This problem was addressed in U.S. Pat. No. 5,291,017 to Wang et al., assigned to the assignee of the present disclosure. Wang et al. teach that electrical circuitry means can be employed to apply an AC dipole and/or monopole voltage to end caps 12 and 14 at the same frequency as the quadrupole trapping voltage. This has the effect of creating an asymmetrical trapping field in which the center of the trapping field is displaced from the geometrical center of the three-dimensional electrode structure. The supplemental voltage distorts the symmetry of the quadrupole field at the center, such that positive and negative ions are separated and ions are preferentially ejected in the direction of a target end cap 12 or 14.

A new ion ejection method described in U.S. Pat. No. 5,714,755 to Wells et al., assigned to the assignee of the present disclosure, also utilizes a quadrupole trapping field that is asymmetric with respect to the radial plane. The asymmetric trapping field is generated by adding an AC voltage out of phase to each end cap 12 and 14 and at the same frequency as the RF voltage applied to ring 16. This trapping field dipole (TFD) component causes the center of the trapping field to be non-coincident with the geometric center of ion trap electrode assembly 10. The first order effect of adding the dipole component to the trapping field is to displace the ions toward the end cap 12 or 14 that has the TFD component in phase with the RF voltage applied to ring 16. A second order effect is to superimpose a substantial hexapole field on the trapping field. The resulting multipole trapping field has a nonlinear resonance at the operating point of $\beta_z = 2/3$ in the stability diagram pertaining to the ion trap structure. Since the ions are already displaced from the geometrical center of the trap by the asymmetric trapping field, the hexapole resonance has a finite value where the ions reside. Likewise at this operating point, a parametric resonance due to a supplementary quadrupole field will also have a non-zero value. Finally, the addition of a supplementary dipole field at this point will also cause dipolar resonant excitation. All three fields will have non-zero values at the operating point of $\beta_z = 2/3$, and therefore a triple resonance condition exists. An ion moved to this operating point will be in resonance with, and absorb power from, all three fields simultaneously.

At the operating point of the triple resonance, power absorption by the ions is nonlinear. The amplitude of the axial ion motion also increases nonlinearly with time and the ion is quickly ejected from the trap. Ion trajectories are less affected by collisions with the damping gas in the region of the resonance due to the short ejection time, and resolution is improved. Moreover, the displacement of the trapping center towards the exit end cap 12 or 14 causes the ions to be ejected exclusively through this electrode, thus doubling the number of ions detected. The system disclosed in U.S. Pat. No. 5,714,755 thus provides significant advantages in the operation of three-dimensional ion trap 10, particularly in the ability to establish an asymmetrical trapping field and nonlinear resonance by a controllable, adjustable electrical means. However, a three-dimensional trap structure 10 does not offer the advantages of a linear, two-dimensional trap structure as described below.

In addition to three-dimensional ion traps, linear and curvilinear ion traps have been developed in which the trapping field includes a two-dimensional quadrupolar component that constrains ion motion in the x-y (or r-θ) plane orthogonal to the elongated linear or curvilinear axis. A two-dimensional electrode structure can be conceptualized from FIG. 1 by replacing end caps 12 and 14 with top and bottom hyperbolically-shaped electrodes that are elongated in the direction into the drawing sheet, and replacing ring 16 with an opposing pair of side electrodes similar to the top and bottom electrodes that are elongated in the same direction and moved closer together. The result is a set of four axially elongated electrodes arranged in parallel about a central axis, with opposing pairs of electrodes electrically interconnected. The cross-section of this four-electrode structure is similar to the electrode set 110, 112, 114, 116 utilized in embodiments of the present disclosure as shown, for example, in FIG. 2A herein.

Ion guiding and trapping devices utilizing a two-dimensional geometry have been known in the art for many decades. The basic quadrupole mass filter constructed from four parallel rods of hyperbolic shape, or from cylindrical rods approximating the hyperbolic shape, was disclosed as early as the afore-mentioned U.S. Pat. No. 2,939,952 to Paul et al. A curved ion trap formed by bending a two dimensional RF quadrupole rod assembly into a circle or oval "racetrack" was described by Church, Journal of Applied Physics, 40, 3127 (1969). A linear two dimensional ion trap formed from a two dimensional RF quadrupole rod assembly was employed to study ion-molecule reactions, as reported by Dolnikowski et al., Int. J. Mass Spectrom. and Ion Proc., 82, 1 (1988).

In the case of a linear ion trap, ions are confined within an electrodynamic quadrupole field when their trajectories are bounded in both the x- and y-directions. The restoring force drives ions toward the central axis of the two-dimensional electrode structure. As in the case of three-dimensional ion trap 10, in a pure quadrupole trapping field of a linear ion trap, the ion motion in both the x- and y-directions are independent of each other and the ion motion in the trapping field is nearly periodic. The equations of motion for a single ion in the trapping field can be resolved into a pure x motion and a pure y motion that have identical mathematical forms described by the Mathieu equation. The Mathieu equation for the y-axis motion again depends on the two trapping parameters $a_y$ and $q_y$ characterizing the solutions in the y-axis direction. Similar parameters, $a_x$ and $q_y$, exist for the x-axis motions. Trapped ions require that stability exist in both the x- and y-directions simultaneously. It is known that non-ideal hyperbolic electrodes, or electrodes of circular shape that are used to approximate hyperbolic fields, generate nonlinear resonances within the field. It is further known, however, that these nonlinear resonances degrade the performance of quadrupole mass filters. Prior to the present disclosure, it is has not been appreciated that nonlinear resonances can be useful in linear ion traps.

For many applications, a linear ion trap provides advantages over a three-dimensional ion trap such as shown in FIG. 1. For instance, the volume of the electrode structure available for ion storage in a linear ion trap can be increased by increasing the linear dimension of the electrode structure, i.e., its axial length. By comparison, the only practicable way to increase the storage volume in the three-dimensional ion trap 10 in FIG. 1 is to increase the radial distance of the hyperbolic electrode surfaces from the center point of the volume, which undesirably increases the RF voltages required for operation. In addition, as compared with three-dimensional ion trap 10, the linear ion trap geometry is better suited for the injection of ions from an external source, as may be preferable to carrying out ionization directly in the volume of the electrode structure. Ions can be injected from an axial end of the linear ion trap structure instead of between adjacent electrodes, and the axial motion of the ion can be stabilized by collisions with a damping gas and/or application of DC voltages at the axial ends of the linear trap structure. Such advantages have been recognized, for instance, in U.S. Pat. No. 4,755,670 to Syka et al. In U.S. Pat. No. 5,420,425 to Bier et al., it was further suggested that increasing the ion storage volume by radially increasing the electrode spacing is disadvantageous because it decreases the m/z range of ions trappable in the volume.

U.S. Pat. No. 4,755,670 to Syka et al. discloses a linear ion trap utilized as a mass spectrometer. In this patent, ion detection is performed by means of image currents induced in the trap electrodes from the characteristic oscillation of ions in the trap due to an applied supplemental AC voltage pulse. The mass spectrum is formed by the Fourier Transform of the time domain image currents to produce a frequency domain spectrum. As in the case of many three-dimensional ion traps, the operation of this linear ion trap is not capable of ejecting ions in a single direction and hence many trapped ions are lost when ejected and thus are not detected.

U.S. Pat. No. 5,420,425 to Bier et al. teaches the use of a two-dimensional RF quadrupole rod assembly as a linear ion trap mass spectrometer. The disclosed method for ion ejection is based on the mass-selective instability scanning technique disclosed in U.S. Pat. No. 4,540,884 to Stafford et al. or on the mass-selective resonance scanning technique disclosed in U.S. Pat. No. 4,736,101 to Syka et al. Ions are ejected from the trap in a transverse direction (i.e., radial relative to the center axis of the electrode assembly) by making the ions either unstable or resonantly excited, causing the ions to be ejected from the trapping volume through a slot in the electrodes and into an ion detector. As in all linear ion traps of the prior art, the center of the trapping field coincides with the structural center axis of the linear electrode structure, i.e., the trapping field is symmetrical. In addition, while the ions can be ejected along one axis, they cannot be ejected in a single direction. Thus, many ions are wasted in the sense that they cannot contribute to the measurements taken for producing a mass spectrum.

The use of a linear ion trap as a mass spectrometer was also reported in U.S. Pat. No. 6,177,668 to Hager, which teaches a linear ion trap in which ion detection occurs by means of axial mass-selective ion ejection. That is, ions are ejected from the linear ion trap along the axis of symmetry of the trap, rather than orthogonal to this axis, and into an ion detector. Ions are mass-selected for ejection by means of an auxiliary AC field formed by applying an AC potential at an exit lens, or an auxiliary AC resonant dipole field formed by applying an AC potential on a pair of opposing electrodes. When the ions are brought into resonance by increasing the RF trapping field amplitude, their amplitude of oscillation increases. The axial potential decreases as the distance from the axis is increased, thereby allowing ions that have increased transverse amplitudes of oscillation to escape the axial potential barrier.

Therefore, a need exists for a linear ion trap apparatus and method in which an asymmetrical trapping field can be formed. A need also exists for a linear ion trap apparatus and method in which ions can be preferentially ejected in a single direction. A need also exists for a linear ion trap apparatus and method in which the amplitude of ion motion can be increased over time at a rate faster than a linear rate. A need further exists for a linear ion trap apparatus and method in which ions can be ejected by nonlinear resonant excitation, and particularly in a single direction. A need further exists for a linear ion trap apparatus and method in which components added to the basic trapping field do not need to be switched on and off during operation of the apparatus.

SUMMARY OF THE INVENTION

Methods are provided for controlling ion motion. According to one method, an electrical ion trapping field comprising a quadrupole component is generating by applying a main AC potential to an electrode structure of a linear ion trap. An additional AC potential is applied to the electrode structure to displace a central axis of the trapping field from a central axis of the electrode structure.

A general matter, methods disclosed herein are useful for mass filtering, mass-selective detection, mass-selective storage, mass-selective ejection, tandem (MS/MS) and multiple MS ($MS^n$) procedures, ion-molecule interaction research, and the like. In particular, the motion of ions can be controlled along a single axis, and predominantly on one side of the central axis if desired. The displaced, or asymmetrical, trapping field enables ions of differing m/z values to be ejected from the field all in a single direction, such as through a single aperture formed in one of the electrodes, which is particularly advantageous when detecting ions for such purposes as producing a mass spectrum of ionized species of a sample starting material. The method is compatible with any type of mass-selective ejection technique, including techniques based on instability and resonant excitation. The method is particularly suited for excitation of trapped ions under nonlinear resonance conditions.

According to another method, the electrode structure of the linear ion trap comprises a pair of opposing electrodes positioned along an axis orthogonal to the central axis, and the additional AC potential is applied to the electrode pair to add a trapping field dipole component to the trapping field, whereby the central axis of the trapping field is displaced along the axis of the electrode pair.

According to another method, the additional AC potential adds a multipole component to the trapping field that introduces a nonlinear resonance condition in the trapping field.

According to another method, one or more ions of differing m/z values are ejected from the trapping field in the same direction.

According to another method, ions are ejected by scanning a parameter of a component of the field, such as the amplitude of the main AC potential, so that ions of differing m/z values successively reach an operating point at which the nonlinear resonance condition is met.

According to another method, a supplemental AC potential is applied to an electrode pair to add a resonant dipole component to the trapping field, wherein the supplemental AC potential has a frequency matching a frequency corresponding to the nonlinear resonance condition.

According to another method, a DC offset potential is applied to an electrode pair to shift the a-q operating point for an ion to a point at which the ion can be resonantly excited to increase its oscillation primarily in the direction of the electrode pair.

According to another method, ions can be provided in the volume of the electrode structure by admitting the ions generally along the central axis. The quadrupolar field as well as other components can be active during this time, as they will not impede the introduction of ions into the volume.

The foregoing methods can be implemented in an electrode structure that is axially segmented into front, center, and rear sections. The various potentials and voltages can be applied to the electrode structure at one or more of these sections as appropriate for the procedure being implemented.

Structurally inherent multipole components can be designed into the electrode structure for the purpose of creating desired resonance conditions. For instance, the electrode structure can be configured so as to be non-ideal as compared with a symmetrical or precisely hyperbolic electrode arrangement. The configuration can comprise modifying the spacing between two or more electrodes, and/or shaping one or more electrodes so as to deviate from the ideal hyperbolic curvature.

According to one embodiment, linear ion trap apparatus comprises an electrode structure defining a structural volume elongated along a central axis. The electrode structure comprises a first pair of opposing electrodes disposed radially to the central axis and a second pair of opposing electrodes disposed radially to the central axis. The apparatus further comprises means for generating an asymmetrical quadrupolar trapping field having a field center displaced from the central axis along an orthogonal axis.

DETAILED DESCRIPTION OF THE INVENTION

In general, the term "communicate" (e.g., a first component "communicates with" or "is in communication with" a second component) is used herein to indicate a structural, functional, mechanical, electrical, optical, or fluidic relationship between two or more components or elements. As such, the fact that one component is said to communicate with a second component is not intended to exclude the possibility that additional components may be present between, and/or operatively associated or engaged with, the first and second components.

The subject matter disclosed herein generally relates to a linear ion trap apparatus and method that can be utilized in a wide variety of applications for which control over ion motion is desired. The apparatus and method are particularly useful for implementing the selection or sorting of ions according to their respective m/z ratios. Thus, the apparatus and method are particularly useful in mass spectrometry although are not limited to this type of operation. As described in more detail below, an asymmetric trapping field is applied to an electrode structure defining the linear ion trap and provides a number of advantages not heretofore realized in linear ion trap configurations. Examples of embodiments of the subject matter will be described in more detail with reference to FIGS. 2A–15D.

Figure 2A:
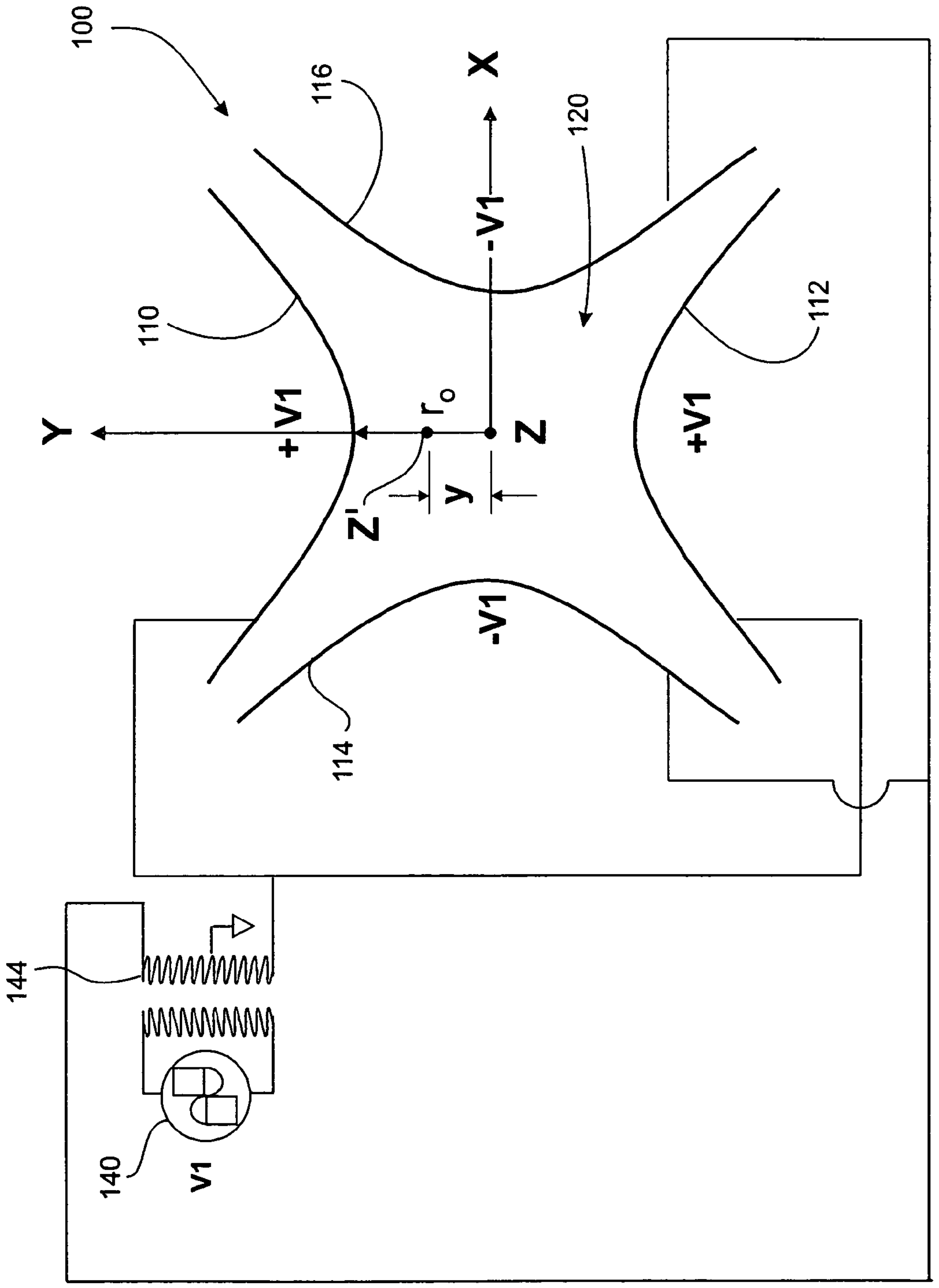
FIG. 2A is a schematic diagram of a linear quadrupole ion trap apparatus according to an embodiment disclosed herein.
Figure 4:
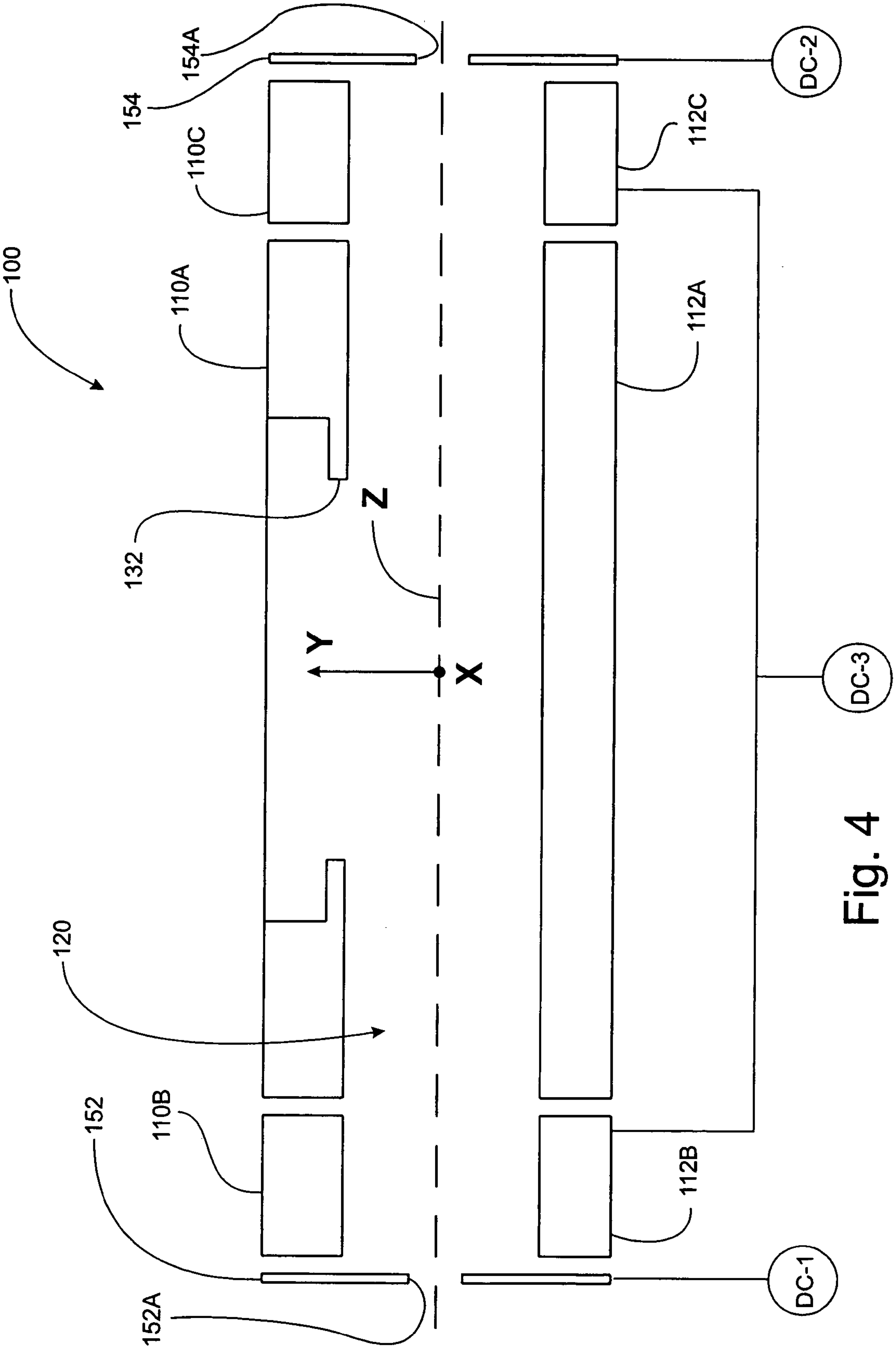
FIG. 4 is a cross-sectional side elevation view of a linear quadrupole ion trap apparatus according to an embodiment disclosed herein.

FIG. 2A illustrates a linear ion trap apparatus 100 comprising an electrode structure and associated circuitry. The electrode structure includes an arrangement of four axially elongated, hyperbolic electrodes 110, 112, 114 and 116. Electrodes 110, 112, 114, 116 are arranged such that electrodes 110 and 112 constitute an opposing pair of electrodes, and electrodes 114 and 116 likewise constitute an opposing pair of electrodes. Electrode pair 110, 112 can be electrically interconnected and electrode pair 114, 116 can be electrically interconnected by any suitable interconnection means. Electrodes 110, 112, 114, 116 are arranged about a central, longitudinal axis of linear ion trap apparatus 100. In the present example, the central axis is arbitrarily taken to be the z-axis which, from the orientation of FIG. 2A, is represented by a point. The cross-section of the electrode structure lies in a radial or x-y plane orthogonal to a central z-axis. Electrode pair 110, 112 is arranged along the y-axis, with each electrode 110 and 112 positioned on opposing sides of the x-axis. Electrode pair 114, 116 is arranged along the x-direction, with electrodes 114 and 116 positioned on opposing sides of the y-axis. The central z-axis is more evident in the cross-sectional side view of another embodiment illustrated in FIG. 4. To form the linear geometry, electrodes 110, 112, 114, 116 are structurally elongated along the z-axis and radially spaced from the z-axis in the x-y plane. The inside surfaces of opposing electrode pairs 110, 112 and 114, 116 face each other and cooperatively define a structural or geometric volume or interior 120 of linear ion trap apparatus 100. The structural or geometric center of volume 120 is generally coincident with the central z-axis. As shown in FIG. 4, one or more of electrodes 110, 112, 114, 116 can include an ion exit aperture 132 to enable collection and detection of ions of selected m/z ratios ejected from structural volume 120 in a radial or orthogonal direction relative to the central axis. Exit aperture 132 can be axially elongated, and in such embodiments can be characterized as a slot.

As shown in FIG. 2A, the cross-section of each electrode 110, 112, 114, 116 can be hyperbolic. The term "hyperbolic" is intended to also encompass substantially hyperbolic profiles. That is, the shapes of electrodes 110, 112, 114, 116 may or may not precisely conform to mathematical parametric expressions describing perfect hyperbolas or hyperboloids. Moreover, the entire cross-sections of electrodes 110, 112, 114, 116 may be hyperbolic or, alternatively, just the curvatures of their inside surfaces facing structural volume 120 are hyperbolic. In addition to hyperbolic sheets or plates, electrodes 110, 112, 114, 116 may be structured as cylindrical rods as in many quadrupole mass filters, or as flat plates. In these latter cases, electrodes 110, 112, 114, 116 can nonetheless be employed to establish an effective quadrupolar electric field in a manner suitable for many implementations.

In some embodiments, assuming no or negligible imperfections in the fabrication and arrangement of the electrode structure, electrodes 110, 112, 114, 116 are symmetrically arranged about the z-axis such that the radial spacing of the closest point of each electrode 110, 112, 114, 116 to the z-axis (i.e., the apex of the hyperbolic curvature) is given by a constant value $r_0$, and thus $r_0$ can be considered to be a characteristic dimension of the electrode structure. In other embodiments, it may be desirable for one or more of electrodes 110, 112, 114, 116 to deviate from an ideal hyperbolic shape or arrangement in order to deliberately produce multipole electric field components of higher order than a basic quadrupole field pattern (e.g., hexapole, octopole, dodecapole, etc.) as described elsewhere in the present disclosure. Other mechanical methods of producing a non-ideal electrode structure include displacing or "stretching" one pair of the electrodes from their ideal separation. Higher-order field components can create a resonance condition in the electric field that can be utilized to excite ions into ejection from the trapping field created within structural volume 120. In other embodiments, higher-order field components can be produced by electrical means as described below, or by a combination of physical characteristics and electrical means.

FIG. 2A further illustrates a voltage source 140 of any suitable design that is coupled with electrodes 110, 112, 114, 116 such that a main potential difference V1 of suitable magnitude and frequency is applied between the interconnected electrode pair 110, 112 and the interconnected electrode pair 114, 116. For instance, voltage source 140 can apply a voltage of +V1 to electrode pair 110, 112 and a voltage of −V1 to electrode pair 114, 116. In some embodiments, voltage source 140 can be coupled with electrodes 110, 112, 114, 116 by a transformer 144 as illustrated in FIG. 2A. The application of voltage source 140 to the electrode structure results in the formation of a quadrupolar electric field effective for trapping stable ions of a selected m/z range in structural volume 120 in accordance with the general, simplified expression $\Phi=U+V\cos(\Omega t)$. That is, voltage source 140 provides at least a fundamental alternating (AC) potential V but may also provide an offsetting direct (DC) potential U having a zero or non-zero value. Whether an ion can be trapped in a stable manner by the quadrupole trapping field depends of the m/z value of the ion and the trapping parameters (amplitude V and frequency Ω) of the field being applied. Accordingly, the range of m/z values to be trapped can be selected by selecting the parameters at which voltage source 140 operates.

Figure 2B:
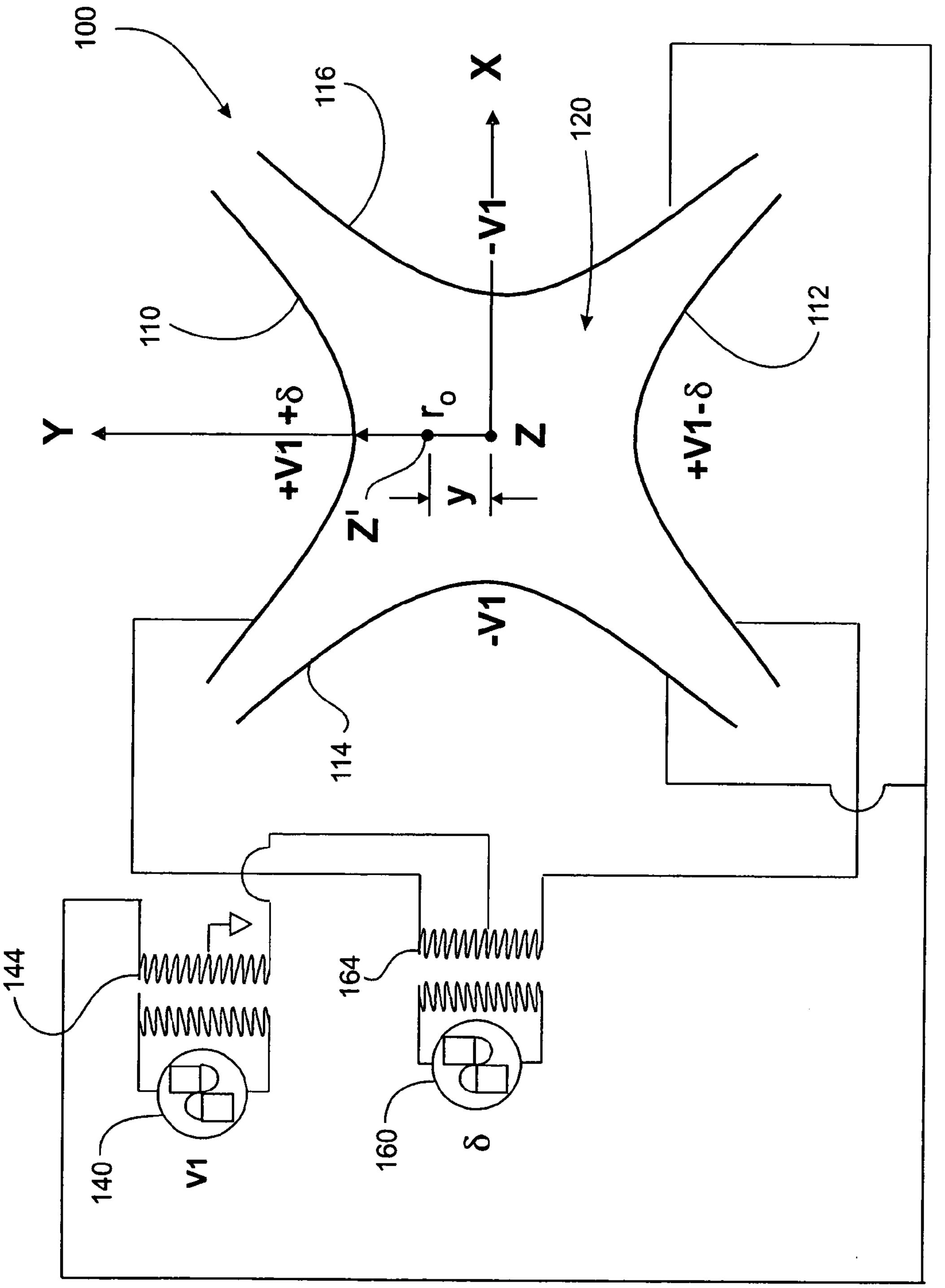
FIG. 2B is a schematic diagram of a linear quadrupole ion trap apparatus according to an another embodiment.
Figure 2C:
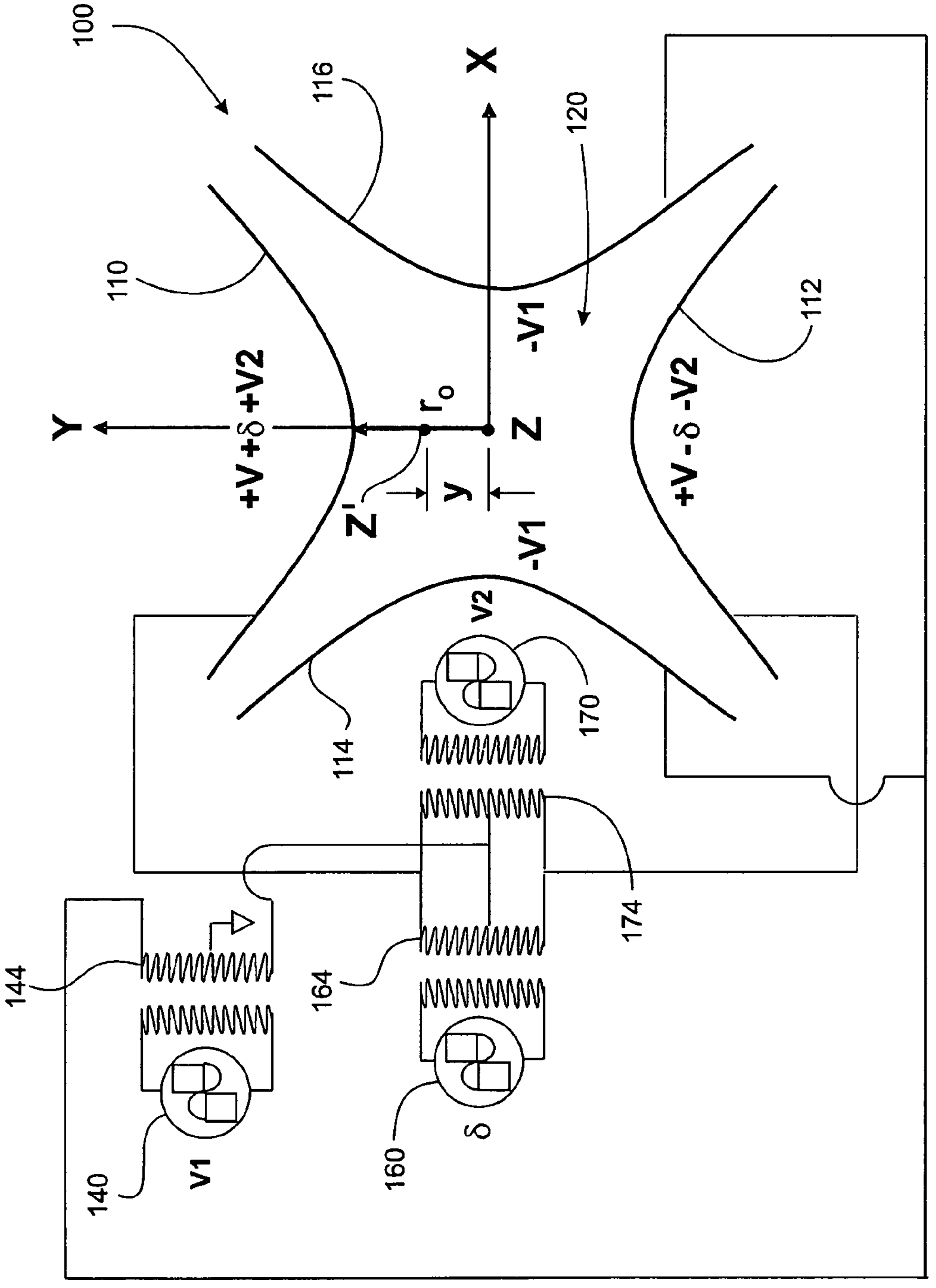
FIG. 2C is a schematic diagram of a linear quadrupole ion trap apparatus according to an another embodiment.

As a general matter, the particular combination of electrical components such as loads, impedances, and the like required for implementing transfer functions, signal conditioning, and the like as appropriate for the methods disclosed herein are readily understood by persons skilled in the art, and thus the simplified schematics shown in FIGS. 2A–2C are considered sufficient to describe the present subject matter. The circuit symbol designating voltage source 140 in FIG. 2A is intended to represent either an AC voltage source or the combination of an AC voltage source in series with a DC voltage source. Accordingly, unless otherwise indicated herein, terms such as "alternating voltage", "alternating potential", "AC voltage", and "AC potential" as a general matter encompass the application of alternating voltage signals, or the application of both alternating and direct voltage signals. Voltage source 140 can be provided in any known manner, one example being an AC oscillator or waveform generator with or without an associated DC source. In some embodiments, the waveform generator is a broadband multi-frequency waveform generator. In typical embodiments, the frequency Ω of the AC component of the trapping field is in the radio frequency (RF) range.

The quadrupolar trapping or storage field generated by voltage source 140 creates a restoring force on an ion present in structural volume 120. The restoring force is directed towards the center of the trapping field. As a result, ions in a particular m/z range are trapped in the direction transverse to the central z-axis, such that the motions of these ions are constrained in the x-y (or radial) plane. As previously noted, the parameters of the trapping field determine the m/z range of ions that are stable and thus able to be trapped in the field. Ions so trapped can be considered as being confined to a trapping volume located within structural volume 120 of the electrode structure. The center of the trapping field is a null or near null region at which the strength of the field is at or near zero. Assuming that a pure quadrupolar field is applied without any modification, the center of the trapping field generally corresponds to the geometric center of the electrode structure (i.e., on the z-axis).

Due to the geometry of linear ion trap apparatus 100 and the two-dimensional nature of the quadrupolar trapping field, an additional means is needed to constrain the motion of ions in the axial z direction to prevent unwanted escape of ions out from the axial ends of the electrode structure and to keep the ions away from the ends of the quadrupolar trapping field where field distortions may be present. The axial trapping means can be any suitable means for creating a potential well or barrier along the z-axis effective to reflect ion motions in either direction along the z-axis back toward the center of the electrode structure. As one example schematically shown in FIG. 4, linear ion trap apparatus 100 can include suitable conductive bodies axially located proximate to the front and rear ends of the electrode structure, such as a front plate 152 and a rear plate 154. By applying DC voltages of suitable magnitudes to front plate 152 and rear plate 154 on the one hand and a DC voltage of a different magnitude to the electrode structure on the other hand, a force will be applied to an ion that is directed along the z-axis of the electrode structure. Thus, ions will be confined along the x-axis and y-axis directions due to the alternating voltage gradient established by the voltage source 140, and along the z-axis by means of the DC potential applied between the electrode structure and front plate 152 and rear plate 154. As described in more detail below, the axial DC voltage can be utilized to control the introduction of ions into structural volume 120.

As previously noted, if just the quadrupolar field were created, the center of the resulting electric trapping field would be coincident with the geometric central axis of symmetry (z-axis) of the electrode structure as in the case of linear ion traps of the prior art. In the present embodiment, however, the quadrupolar trapping field is modified so as to render the field asymmetrical relative to the z-axis. In advantageous embodiments, the quadrupolar field is modified by superposing or adding an additional electrical energy input to the field, such as an additional voltage potential that results in a combined or composite trapping field. According to one embodiment, an additional AC potential is applied to one of the electrode pairs 110, 112 or 114, 116 of the electrode structure. The resulting combined trapping field is no longer a pure quadrupole field, and is asymmetrical relative to the geometric center z-axis such that its field center is displaced or offset away from the z-axis. By way of example, FIG. 2A illustrates a z'-axis representative of the center of the asymmetrical trapping field after impressing the additional AC potential across electrode pair 110, 112. The central z'-axis of the asymmetrical trapping field is displaced from the geometrical central z-axis along the y-axis by an amount y. The displacement amount y could be generalized for the radial x-y plane by being characterized as r, as the offset trapping field need not be displaced precisely along the y-axis.

The use of the asymmetrical trapping field can provide a number of advantages. For instance, after trapping ions, the asymmetrical trapping field can facilitate ejection of all ions of a selected m/z ratio or a selected range of consecutive m/z ratios toward a single target or targets (for example, ion exit aperture 132 of electrode 110A shown in FIG. 4) by any suitable ion ejection technique. Because all ions are ejected in a single direction, there is no loss of ions on the opposite electrode (for example, electrode 112A shown in FIG. 4). Thus, a greater number of selected ions can be detected, and only a single detector is needed. In advantageous embodiments, the asymmetrical trapping field can facilitate ion ejection by means of resonance excitation. In further advantageous embodiments, the asymmetrical trapping field can be employed in conjunction with an ion ejection technique that relies on nonlinear resonance excitation. The conditions for nonlinear resonance can be established by modifying the quadrupolar trapping field. The trapping field can be modified by additional electrical energy inputs and/or by inherent physical characteristics of the electrode structure (e.g., a non-ideal electrode structure as previously described). In one advantageous implementation, ejection by nonlinear resonant excitation can be facilitated or enhanced through the additional application of one or more supplemental excitation voltages. The utilization of nonlinear resonances in linear ion traps has not been recognized in the prior art. As will be demonstrated below, unlike prior resonance ion ejection techniques, the ejection of ions by nonlinear resonance in the trapping field according to the present disclosure causes the ion amplitude of oscillation to increase in time at a faster rate than a linear rate, is not limited by the existence of a null region in the trapping field, and can be unidirectional toward a desired target electrode. The faster ion ejection rate reduces the effects of ion collisions with any damping gas present in structural volume 120 during the ejection process.

In operation, ions are provided in structural volume 120 of linear ion trap apparatus 100 by any suitable means. In the present context, the term “provided” is intended to encompass either the introduction of ions into structural volume 120 or the formation of ions in structural volume 120. That is, in one embodiment, ions can be formed by ionizing sample material in an ionization source of any known design that is external to the electrode structure of linear ion trap apparatus 100. After ionization, the ions are conducted into structural volume 120 by any known technique. In another embodiment, gaseous or aerosolized sample material can initially be injected into structural volume 120 from a suitable source (e.g., an interface with the outlet of a gas or liquid chromatographic instrument), and a suitable ionization technique can then be performed in structural volume 120 to create the ions. In either case, after ions are provided in structural volume 120, the combined asymmetrical trapping field comprising a quadrupolar voltage and at least one additional energy input (e.g., an additional AC voltage) is applied to the electrode structure as described above. The parameters (e.g., amplitude, frequency) of the trapping field are set to stabilize the trajectories or paths of all ions of a desired range of m/z values. As a result, the stable ions are constrained to orbital paths about a trapping field center (z'-axis) that is displaced from the mechanical center represented by the z-axis. As appreciated by persons skilled in the art, a damping gas can be introduced into structural volume 120, such as by from the outlet of a gas source 162 shown in FIG. 5. The damping gas has the effect of damping the amplitude of the oscillations of trapped ions, such that the ions relax into a bunch or cloud concentrated about the trapping field center, which in the present embodiment is the asymmetrical trapping field center represented by the z'-axis in FIG. 2A.

The asymmetrically trapped ions can be stored for a desired period of time, and thereafter ejected from the trapping field by any known technique. For example, one or more parameters (e.g., voltage magnitude and/or frequency) of one or more voltage components of the combined field can be scanned to induce ejection of ions of successive m/z values. Ejected ions can thereafter be detected by an external detector according to any known technique (for example, using a Faraday cup, an electron multiplier, or the like). Alternatively, a detection instrument of known design can be incorporated into the electrode structure or disposed within structural volume 120. It will be understood that the magnitude of ion motion can be increased for purposes other than ejection or in addition to ejection, one example being the promotion of collisional-induced dissociation (CID) with background gas molecules for reaction or fragmentation.

FIG. 2B illustrates an embodiment of linear ion trap apparatus 100 well-suited for forming an asymmetrical trapping field. The trapping field can be rendered asymmetrical through application of an additional, alternating potential difference δ from an auxiliary voltage source 160 to one pair of opposing electrodes. Preferably, at least one of the electrodes of this pair includes an aperture through which ions can be ejected for detection. In the illustrated example, the auxiliary potential δ is coupled by a transformer 164 to electrode pair 110, 112. In this example, the storage voltage source 140 that establishes the fundamental quadrupolar trapping field communicates with electrode pair 110, 112 via the center tap of transformer 164 and the center tap of transformer 144 is grounded. It will be appreciated, however, that other circuitry arrangements could be employed to apply the appropriate potentials to the electrode structure. Application of the auxiliary alternating potential δ results in the superposition of a dipolar component (a trapping field dipole, or TFD) on the trapping field. Voltage sources 140 and 160 cooperate to apply a voltage of (+V+δ) to electrode 110 and a voltage of (+V−δ) to electrode 112. In advantageous embodiments, auxiliary potential δ is applied across electrodes 110 and 112 at the same frequency as the trapping field potential V1 applied between electrode pairs 110, 112 and 114, 116, and at the same relative phase. It is also advantageous to set the strength of the dipole at a desired constant fraction of the strength of the quadrupole. As will be demonstrated more rigorously below, this results in the uniform displacement of the trapping field along the y-axis.

In further advantageous embodiments, application of the auxiliary alternating potential 6 results in two components being added to the trapping field. The first component is the afore-mentioned dipolar component that has the effect of displacing the center of the trapping field away from the geometric axis of symmetry (z-axis) of the electrode structure. The second component added to the trapping field is a hexapolar component (i.e., a third-order component). As will be demonstrated more rigorously below, the hexapolar component generates nonlinear resonances in the trapping field. The hexapolar nonlinear resonance can be used to eject ions from the ion trap through an aperture in one of the electrodes such as exit aperture 132 shown in FIG. 4.

FIG. 2C illustrates an embodiment of linear ion trap apparatus 100 that makes advantageous use of the addition of the hexapolar component to the electric field applied to the electrode structure, whereby selected ions can be ejected in response to a nonlinear resonance condition established in the field. In addition to the voltage source 140 used to generate the quadrupolar trapping field and the auxiliary voltage source 160 used to add the dipolar and hexapolar components, a yet further electrical energy input such as an additional voltage potential is provided for resonantly exciting ions in a desired range of m/z ratios into a state that enables these ions to overcome the restoring force of the asymmetrical trapping field in a controlled, directional manner. In the embodiment illustrated in FIG. 2C, an additional voltage source 170 is provided to apply a supplemental alternating excitation potential V2 across the same electrode pair to which the auxiliary potential δ is applied. Thus, in the present embodiment, an excitation potential V2 is applied across electrodes 110 and 112. Voltage sources 140, 160 and 170 cooperate to apply a voltage of (+V+δ+V2) to electrode 110 and a voltage of (+V−δ−V2) to electrode 112. The excitation potential is applied at a frequency corresponding to the a-q operating point (see FIG. 3) of the nonlinear resonance used for ion ejection. To eject ions, the amplitude of the trapping potential V1 (and the associated DC offset component of the quadrupolar field if provided) is increased to increase the operating point of the ions. Once the operating point of an ion of a given m/z ratio matches the frequency of the supplemental resonance potential V2 and the nonlinear resonance provided by the auxiliary potential δ, the ion is ejected from the trap for detection.

Figure 3:
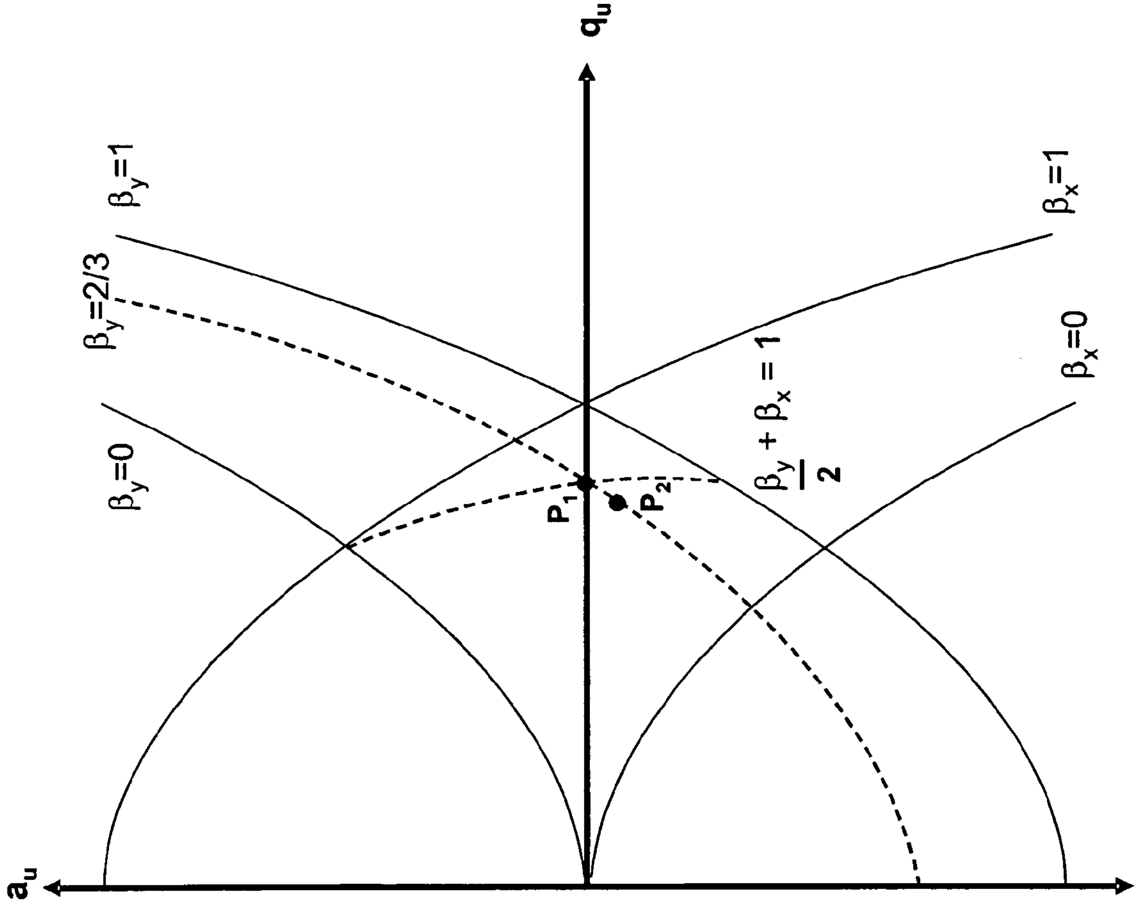
FIG. 3 is a stability diagram plotted in a-q space describing ion motion in a linear ion trap apparatus as disclosed herein.

In advantageous embodiments, linear ion trap apparatus 100 is operated at fundamental trapping and secular frequencies that result in the a-q operating point being located along the iso-beta line $\beta_y=2/3$ in the stability diagram of FIG. 3. For a given axial direction y, $\beta_y$ is correlated with the secular frequency $\omega_{sec}$ of an ion and the drive frequency $\Omega$ of the main AC potential according to $\omega_{sec}=(\beta_y/2)\Omega$. Ejection of ions at $\beta_y=2/3$ allows phase-locking of the supplemental resonance frequency with the trapping field frequency because these frequencies are integer multiples of each other. Moreover, the frequency difference between the fundamental and first sideband frequencies in the ion motion is large so that no significant beat frequency occurs that would add jitter to the ion ejection process, and therefore mass resolution is increased.

If linear ion trap apparatus 100 is operating at $\beta_y=2/3$ and the quadrupolar trapping potential V1 has no DC component, then the parameter $a_y=0$ and the operating point is $P_1$ in FIG. 3 where the iso-line for $\beta_y=2/3$ intersects the iso-line for $(\beta_y/2)+\beta_x=1$. As described more fully below, operation at $P_1$ is not optimal because y-coordinate ion oscillation is coupled to x-coordinate ion oscillation at this point. Accordingly, in advantageous embodiments, a DC potential is applied to the same electrode pair to which the auxiliary potential $\delta$ is applied (electrodes 110 and 112 in the present example). As described more fully below, this DC potential serves to shift the a-q operating point to a position below the $q_y=0$ axis of the stability diagram of FIG. 3. In other words, the value of the trapping parameter $a_y$ is shifted from $a_y=0$ to $a_y<0$. When operating along the iso-$\beta$ line $\beta_y=2/3$, the effect is to shift the operating point from $P_1$ to $P_2$ in the stability diagram, where the two nonlinear resonances are not degenerate and y-coordinate ion oscillation is decoupled from x-coordinate ion oscillation. This ensures ion ejection in a single, desired direction along the y-axis. It is thus advantageous in this embodiment that the supplemental excitation potential V2 be applied at a frequency corresponding to operating point $P_2$ to effect ion ejection. It will be noted that the apparatus and methods disclosed herein are not limited to operating along $\beta_y=2/3$, although it is advantageous to do so. As a general matter, the DC component can be added to the trapping potential to move the operating point for ion ejection to a location in a-q space at which any degeneracy between pure and coupled nonlinear resonances is removed, so that only a pure resonance influences the ion motion and the amplitude of oscillation of ion motion increases primarily in one direction.

Additional embodiments of linear ion trap apparatus 100 will now be described with reference to FIGS. 4–6.

Figure 5A:
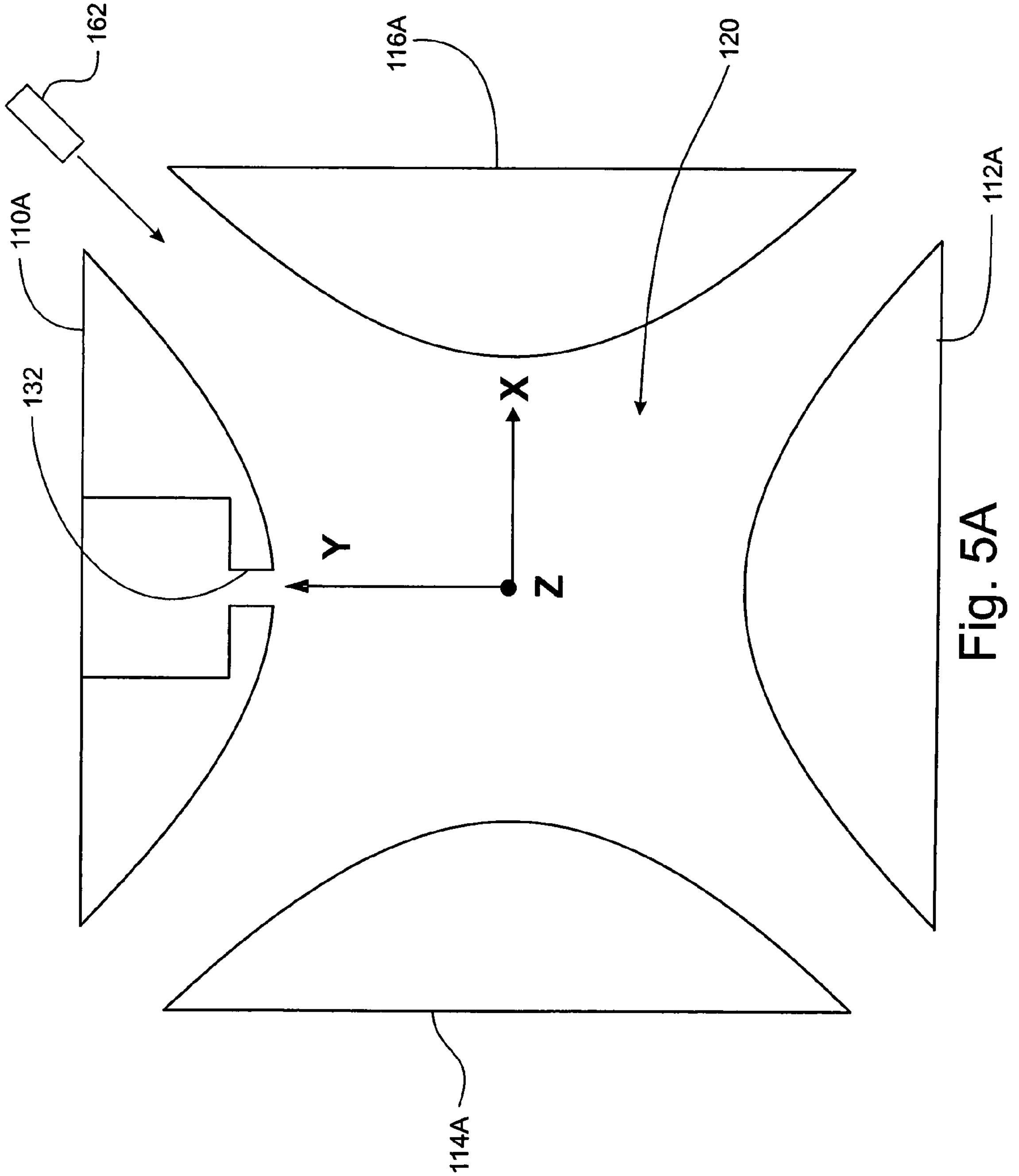
FIG. 5A is a cross-sectional elevation view taken in an x-y plane of the apparatus illustrated in FIG. 4.
Figure 5B:
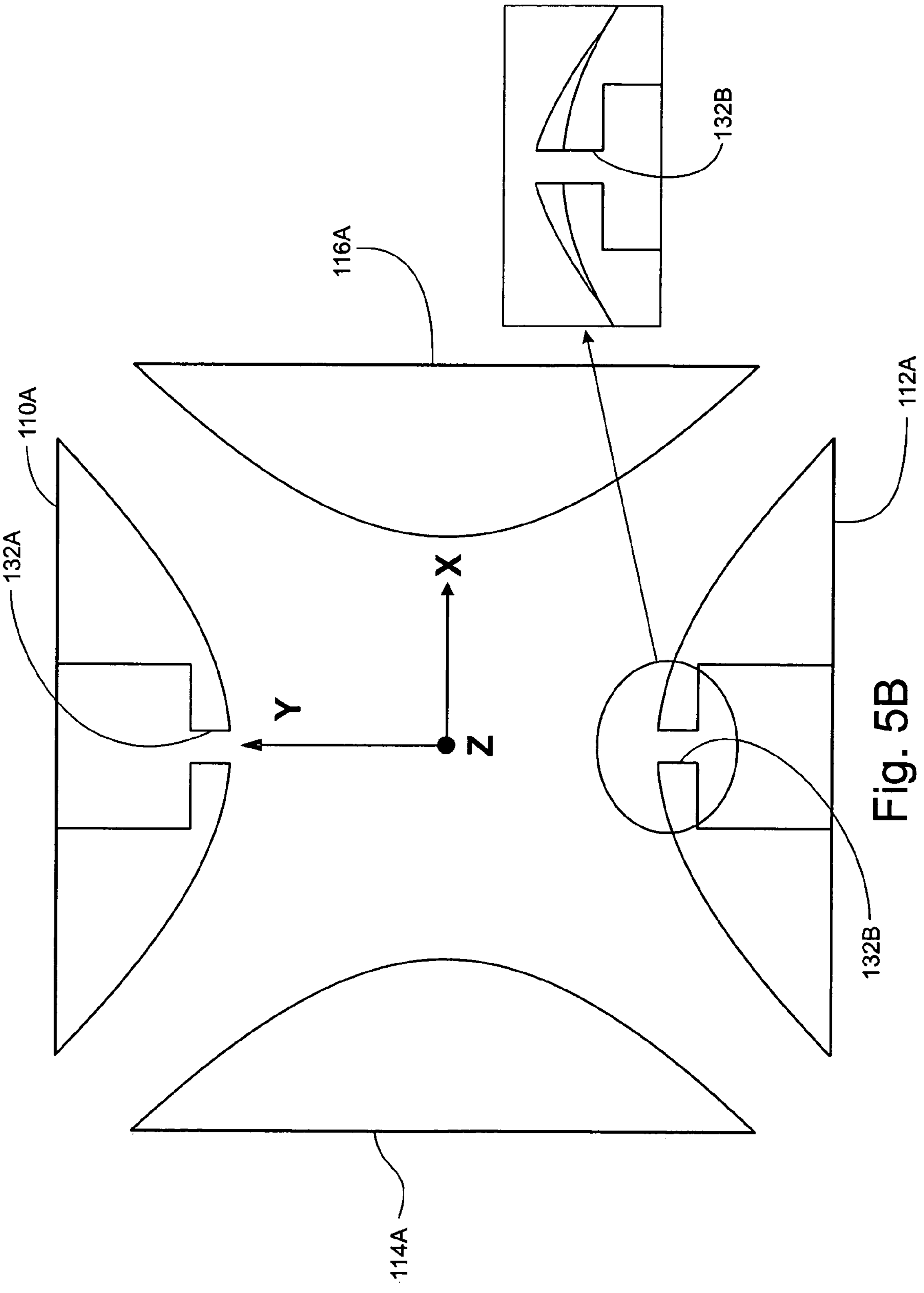
FIG. 5B is a cross-sectional elevation view taken in an x-y plane of the apparatus illustrated in FIG. 4 according to one or more additional embodiments.
Figure 6:
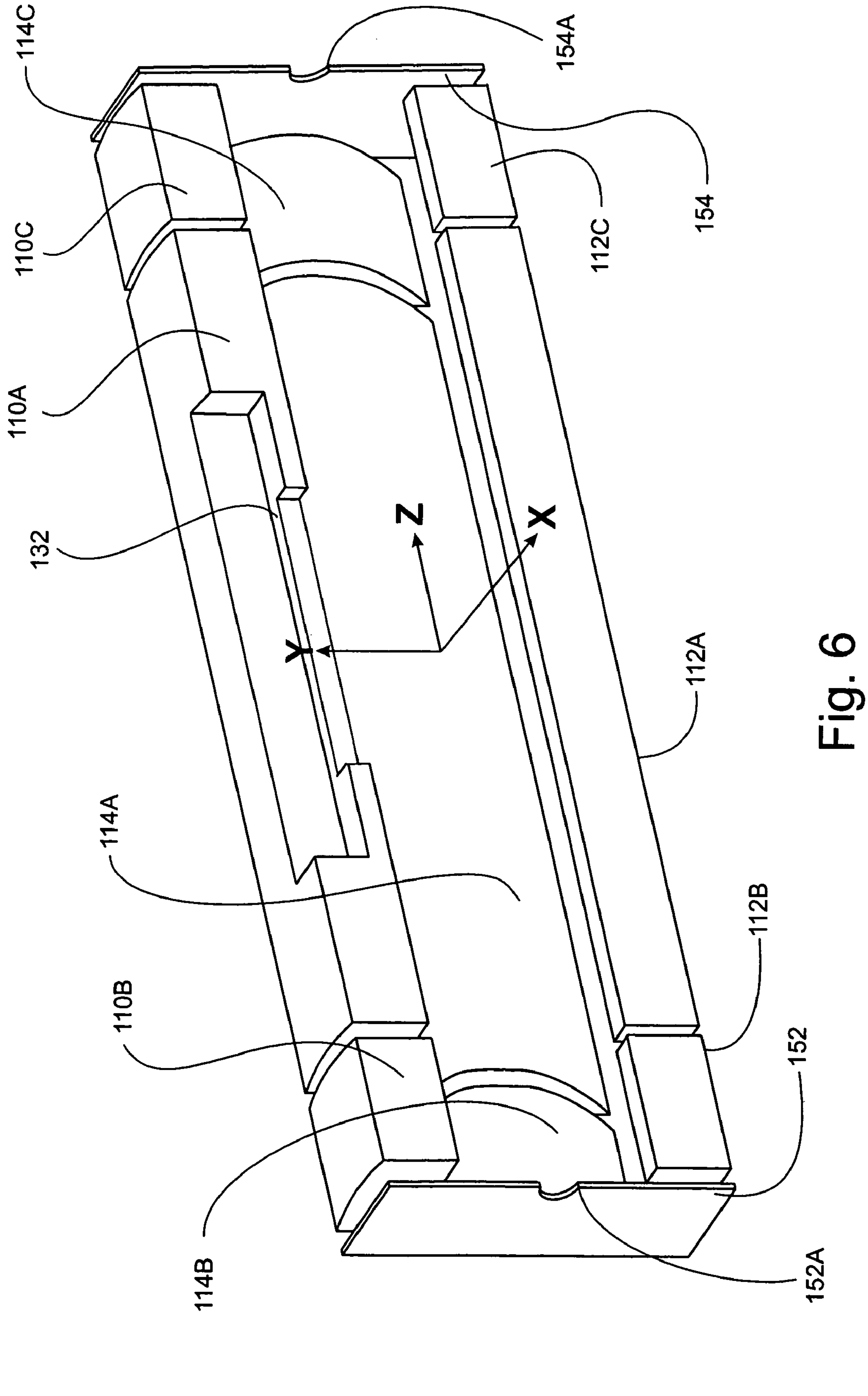
FIG. 6 is a cut-away perspective view of the apparatus illustrated in FIG. 4.

Referring to FIGS. 4–6, in some embodiments, the previously described four elongated hyperbolic electrodes 110, 112, 114, 116 can be axially segmented, i.e., segmented along the z-axis, to form a set of center electrodes 110A, 112A, 114A, 116A (FIG. 5); a corresponding set of front end electrodes 110B, 112B, 114B, 116B (FIG. 6); and a corresponding set of rear end electrodes 110C, 112C, 114C, 116C (FIG. 6). Front and rear electrodes 116B and 116C are not actually shown in the drawings, but it will be understood that front and rear electrodes 116B and 116C are inherently present, are shaped like the other electrodes shown, and are essentially mirror images of front and rear electrodes 114B and 114C shown in the cut-away view of FIG. 6. In some embodiments, front end electrodes 110B, 112B, 114B, 116B and rear end electrodes 110C, 112C, 114C, 116C are axially shorter than center electrodes 110A, 112A, 114A, 116A. In each electrode set, opposing electrodes are electrically interconnected to form electrode pairs as previously described. In some embodiments, the fundamental voltage V1 (FIGS. 2A–2C) that forms the quadrupolar trapping field is applied between the electrode pairs of front electrodes 110B, 112B, 114B, 116B and rear electrodes 110C, 112C, 114C, 116C as well as center electrodes 110A, 112A, 114A, 116A. Front plate 152 is axially located proximate to the front end of front electrodes 110B, 112B, 114B, 116B, and rear plate 154 is axially located proximate to the rear end of rear electrodes 110C, 112C, 114C, 116C.

In the embodiment illustrated in FIG. 4, DC bias voltages can be applied in any manner suitable for providing a potential barrier along the z-axis (positive for positive ions and negative for negative ions) to constrain ion motion along the z-axis. The DC axial trapping potential can be created by one or more DC sources. In the example illustrated in FIG. 4, a voltage DC-1 is applied to front plate 152 and a voltage DC-2 is applied to rear plate 154. An additional voltage DC-3 is applied to all four electrodes of both the front electrode set 110B, 112B, 114B, 116B and rear electrode set 110C, 112C, 114C, 116C adjacent to the center electrode set 110A, 112A, 114A, 116A. The combination of the alternating trapping potential and the DC bias voltages forms the basic linear trap. Alternatively, voltage DC-1 could be applied to front end electrodes 110B, 112B, 114B, 116B, voltage DC-2 applied to rear end electrodes 110C, 112C, 114C, 116C, and voltage DC-3 applied to center electrodes 110A, 112A, 114A, 116A. In some embodiments, front plate 152 has an entrance aperture 152A so that front plate 152 can be used as a lens and gate for admitting ions into structural volume 120 at a desired time by appropriately adjusting the magnitude of voltage DC-1. For example, an initially large gating potential DC-1' impressed on front plate 152 can be lowered to the value DC-1 to allow ions having a kinetic energy sufficient to exceed the potential barrier on front plate 152 to enter the trap. The voltage DC-2, which normally is greater than voltage DC-1, prevents ions from escaping out from the back of the electrode structure. After a predetermined time, the potential on front end plate 152 can again be raised to the value DC-1' to stop additional ions from entering the trap. In advantageous embodiments, ions are admitted along or substantially along the z-axis via entrance aperture 154A of front plate 152. Alternatively, ions can be admitted into structural volume 120 through a gap between two adjacent electrodes, or through an aperture formed in an electrode. Rear end plate 154 can likewise have an exit aperture 154A for any number of purposes, such as for removing ions lying outside the m/z range of interest.

In various embodiments employing the segmented linear electrode structure illustrated in FIGS. 4–6, a combined or mixed electric field can be established for trapping and optionally ejecting ions according to any method described herein. For example, at appropriate times, the fundamental trapping potential V1 can be applied in combination with additional potentials such as the operating-point shifting DC potential, the auxiliary potential $\delta$, and the supplementary excitation potential V2, using appropriate circuit components and connections as described previously in conjunction with FIG. 2A–2C. The auxiliary potential $\delta$ having the same frequency and phase as the fundamental trapping auxiliary potential V1 can be applied between one pair of electrodes to form the dipole and hexapole components in the resultant electric field. The DC operating-point shifting potential can be applied to the same electrode pair as the auxiliary potential $\delta$ to shift the ion operating point from the $q_y$ axis ($a_y=0$) to a line below the $q_y$ axis ($a_y<0$); for example, to shift from operating point $P_1$ to $P_2$ in FIG. 3. The supplemental excitation potential V2 can be applied across the same electrode pair as the auxiliary potential $\delta$ at a frequency corresponding to the operating point used for ion ejection, which advantageously is the operating point $P_2$ in FIG. 3 as described elsewhere in the present disclosure.

In some embodiments, the auxiliary potential δ and DC offset potential are applied to an electrode pair of only the center section of the electrode structure (e.g., electrode pair 110A, 112A). In other embodiments, the auxiliary potential δ and DC offset potential are applied to the same electrode pair at the front and rear sections of the electrode structure (e.g., electrode pairs 110B, 112B and 110C, 112C) as well as at the center section. Consequently, the region between center electrodes 110A, 112A, 114A, 116A and each set of end electrodes 110B, 112B, 114B, 116B and 110C, 112C, 114C, 116C can be made identical to eliminate any fringe field between them. This in turn eliminates any perturbations to ions proximate to the ends of center electrode set 110A, 112A, 114A, 116A. The asymmetrical trapping field and any of the additional fields can be active at any time in any of the sections of the electrode structure while ions are entering the electrode structure, without detrimentally affecting the transmission of the ions into structural volume 120. For example, as shown in FIG. 11B, the AC trapping dipole field can initially be applied only at center electrodes 110A and 112A, such that ions enter the trap structure along the central z-axis and, upon reaching the center section, are moved off the z-axis and come to rest along the displaced axis of the asymmetrical field in the center section. Once entry of all ions is complete and the volume of ions of a selected range of m/z values has been stabilized in the center section, the trapping field in the end sections can be adjusted to become uniformly displaced as in the center section to reduce perturbations as previously indicated.

Figure 1:
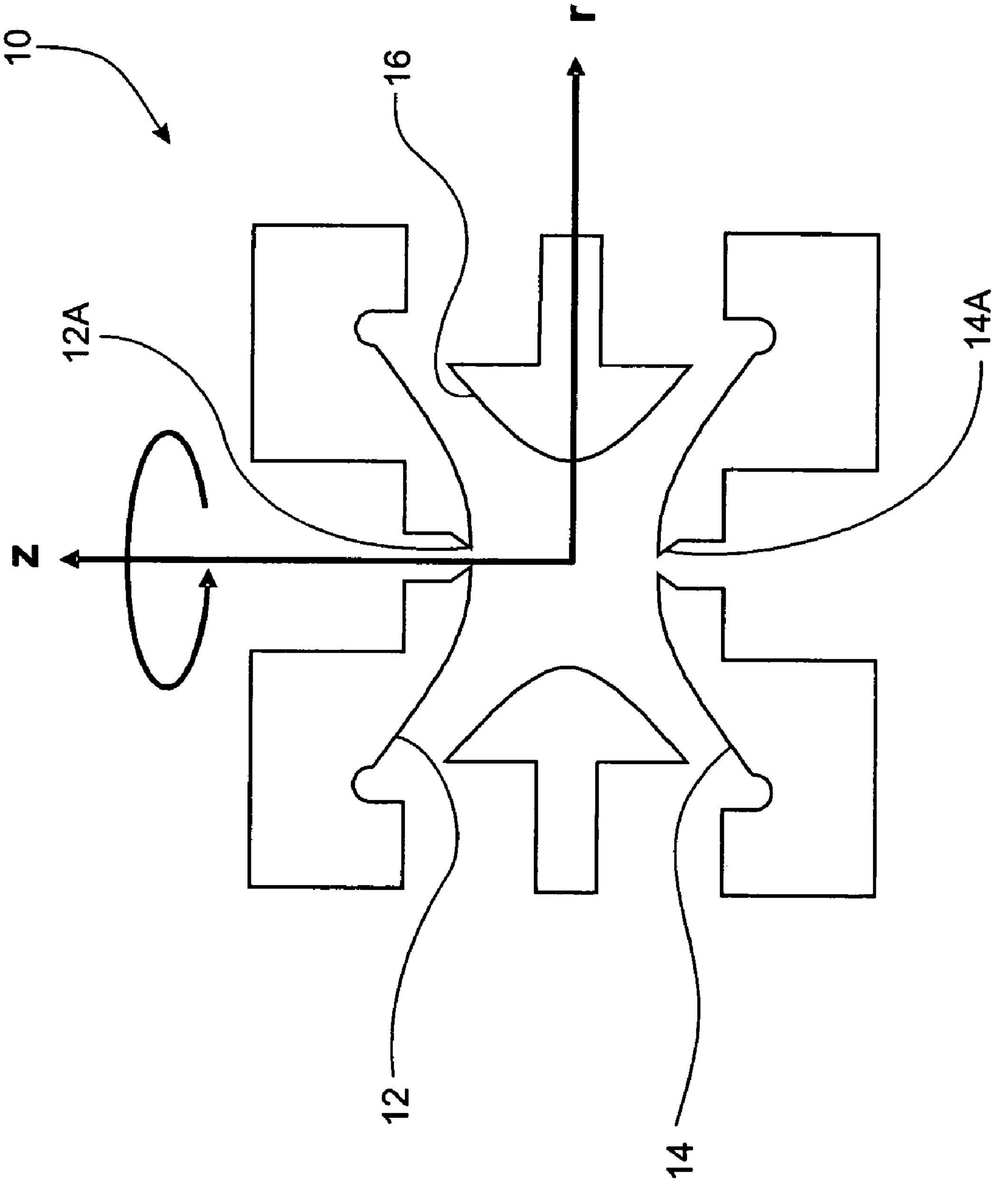
FIG. 1 is a cross-sectional view of a known three-dimensional quadrupole ion trap.

It can be seen that ions can enter the trapping field along the center axis while the additional field components forming the nonlinear resonances are turned on. That is, the additional field components do not have to be turned off when ions enter the trap structure and then turned on when ions are scanned from the trap structure. At the center axis, all nonlinear resonances are precisely zero. This feature is an advantage over prior art ion traps in which complex electrical circuitry has been required to switch additional field components on and off. This feature is particularly advantageous over three-dimensional ion traps such as trap structure 10 illustrated in FIG. 1. In three-dimensional ion traps, ions enter along the axis of rotational symmetry (the z-axis in FIG. 1) and therefore at a distance that is maximal with respect to the center of the trap. At large distances from the center, unwanted nonlinear resonances present in the trapping field due to the addition of a trapping field dipole will result in unwanted ion ejection, therefore necessitating the design of switching circuitry such as described in U.S. Pat. No. 5,714,755 to Wells et al., assigned to the assignee of the present disclosure. Moreover, broadband multi-frequency waveforms applied to opposing electrodes in a linear ion trap structure do not impede the motion of ions entering along the central axis because the waveforms produce forces transverse to the direction of the ion beam. By comparison, a broadband multi-frequency waveform applied to end cap electrodes 12 and 14 of the three-dimensional trap structure 10 illustrated in FIG. 1 will form a potential barrier that reduces ion transmission into the trap from an external ion source. This is because the oscillating electric field is aligned in a direction that is collinear with the direction of the ion beam.

In some embodiments, the voltage source 170 (FIG. 2C) employed to apply the excitation potential V2 is a broadband multi-frequency waveform signal generator. The broadband multi-frequency waveform signal can be applied across an opposing pair of the center electrodes 110A, 112A, 114A, 116A during the time period when ions are entering the trap, with the frequency composition selected to remove unwanted ions from the trap by resonance ejection.

As schematically shown in FIG. 5A, in some embodiments, one or more gas sources 162 can be provided to inject a damping, buffer or collision gas into structural volume 120. As appreciated by persons skilled in the art, a damping gas can be used to dampen the oscillations of trapped ions so that the ions tend to bunch into a cloud in the region at the center of the trapping field. Examples of suitable gases include, but are not limited to, hydrogen, helium, and nitrogen. One example of a pressure at which structural volume 120 can be charged by the damping gas ranges from approximately $0.5\times10^{-3}$ Torr to approximately $10\times10^{-3}$ Torr. It will be understood, however, that the subject matter disclosed herein can encompass other types of gases and other gas pressures. For example, gas source 162 could also be used to provide a background gas for CID processes or a reagent gas for conducting chemical reactions.

As illustrated in FIG. 5B, in some embodiments, two identical but oppositely disposed exit apertures can be provided. For example, an exit aperture 132A can be formed in electrode 110A and an exit aperture 132B can be formed in electrode 112A. As in other embodiments, only one of exit apertures 132A or 132B is necessary for ion ejection in a single direction. The presence of an opposite exit aperture, however, can be advantageous in that the symmetry of the electrode structure is improved and unwanted field effects such as electrical fringe effects are avoided.

As further illustrated in FIG. 5B, the edges of each electrode that define an aperture can be shaped and/or the aperture sized so as to reduce any effects due to the presence of that aperture, such as perturbations of the trapping field, unacceptably significant fringe field effects, unwanted multipole components, and the like. As a general matter, for an ideal hyperbolic set of electrodes extending to infinity in all directions, the desired quadrupole field is the only multipole component in the field. When, however, the hyperbolic electrodes are truncated to a finite size as is necessary for providing an actual device, then additional multipole components are added to the field—i.e., more components are required in the expression for the total potential of the applied field. These additional multipole components may represent undesirable distortions of the pure or theoretical quadrupolar field from which functional benefits cannot be gained (at least practicably). Likewise, providing an electrode in which an aperture such as a slot is formed also changes the multipole composition. Some multipole components such as an octopole component introduced as a result of truncating the electrodes can be compensated for by changing the asymptotic angle of the electrode pair across which the dipole field is applied, or by changing their separation. In addition, adding a bump or other change to the mechanical shape of the electrode can also introduce—or in other cases null out—unwanted multipole components in the field. Generally, the relationship between a particular mechanical shape of an electrode and the multipole composition of the field is not well known and is usually determined empirically.

The adverse effects of an aperture in an electrode may be minimized, for example, by shaping the edges or area of the electrode defining the aperture in a manner that deviates from the theoretical hyperbolic shape so as to reduce or compensate for any perturbation of the trapping field due to presence of that aperture. In addition, the dimensions of the aperture (i.e., length and width in the case of a slot) should be minimized as much as practicable, but without unduly diminishing the ability of linear ion trap apparatus 100 to eject and detect a sufficiently large number of ions. As compared with three-dimensional ion traps, linear ion trap apparatus 100 has a dominant axial dimension. The structural volume 120 defined by linear ion trap apparatus 100 is thus axially elongated. This is considered to be an advantage over three-dimensional ion traps because, in relative terms, the two-dimensional geometry of linear ion trap apparatus 100 can trap and sort a larger number of ions than a three-dimensional geometry. On the other hand, a consequence of the elongated structural volume 120 is that the trapping volume for ions, i.e., the cloud of ions confined by the trapping field, is also axially elongated. It is thus advantageous for the aperture of a given electrode to likewise be elongated as a slot to maximize the transfer of ejected ions to a detector without first being annihilated or neutralized by striking the electrode. Accordingly, the size of the slot should be determined in consideration of the competing criteria of maximizing ion transfer and minimizing field effects. Moreover, the slot should generally be located so as to be axially centered relative to the axial ends of the electrode structure, and/or the length of the slot should be limited, such that the axial edges of the slot are kept somewhat remote from the ends of the electrode structure. This is because non-quadrupolar DC fields applied to the electrode structure for purposes such as axially confining the trapped ions may cause ejection of ions at unwanted times or ejection of ions of unintended m/z values. By centering the slot and/or keeping the slot spaced away from the electrode ends, control over the particular ejection technique implemented is better ensured. In addition, ion ejection efficiency may be optimized by locating the slot centrally about the apex of the hyperbolic curve of the electrode, because deviation from the apex may increase the likelihood of an ejected ion striking an edge or surface defining the slot.

The subject matter disclosed herein can be further understood by considering the following more rigorous discussion of principles upon which various embodiments of ion trap apparatus 100 operate, including the development of an electrodynamic linear trapping field, the superposition of the dipole and hexapole components, and the application of ion trap apparatus 100 to mass scanning procedures. It will be understood, however, that the following discussion is not intended to limit or qualify the scope of the subject matter claimed herein.

The potential $\Phi$ in the space between electrodes symmetrically disposed about a central axis (z-axis) in general must satisfy Laplace's equation in cylindrical coordinates:

$$\nabla^2\Phi(r,\theta,z)=\frac{1}{r}\frac{\partial\left(r\frac{\partial\Phi}{\partial r}\right)}{\partial r}+\frac{1}{r^2}\frac{\partial^2\Phi}{\partial\theta^2}+\frac{\partial^2\Phi}{\partial z^2}=0 \quad (1)$$

A general solution to Laplace's equation is given by:

$$\Phi(r,\theta)=\sum_{N=0}^{\infty}\left[(A'_N r^N+B'_N r^{-N})(C_N\cos(N\theta)+D_N\sin(N\theta)\right]+A_0\ln\left(\frac{r}{a}\right) \quad (2)$$

Referring to FIG. 2A, if electrodes 110 and 112 are at the same potential, as well as electrodes 114 and 116 and, further, if an arbitrary alternating potential and static DC potential are applied between electrode pairs 110, 112 and 114, 116, then the entire time-dependent potential field is given by:

$$V_t(r,\theta,t)=\sum_{n=0}^{\infty}\Phi(r,\theta)\left[a_n+b_n\cos\left[\frac{n\Omega}{2}(t-t_n)\right]\right] \quad (3)$$

Limiting the harmonic content of the alternating potential to only the fundamental reduces the potential to the form:

$$V_t(r,\theta,t)=\Phi(r,\theta)[U+V\cos[\Omega(t-t_n)]] \quad (4)$$

where U is the DC voltage and V is the alternating voltage.

The potential must be finite at the origin, and therefore:

$A'_N=0$ for $N=0$ and $B'_N=0$ for $N\geqq 0$.

Let $$A'_N C_N=\left(\frac{1}{r_0}\right)^N A_n \text{ and } A'_N D_N=\left(\frac{1}{r_0}\right)^N B_n.$$

Therefore:

$$\Phi(r,\theta)=\sum_{N=0}^{\infty}\left(\frac{r}{r_0}\right)^N[A_N\cos(N\theta)+B_N\sin(N\theta)]. \quad (5)$$

The general form of the electrodynamic potential for a time-dependent field in a cylindrical coordinate system (r, θ) is given by:

$$V_t(r,\theta,t)=\sum_{N=0}^{\infty}\left(\frac{r}{r_0}\right)^N[A_N\cos(N\theta)+B_N\sin(N\theta)][U+V\cos[\Omega(t-t_n)] \quad (6)$$

Since $r^N\cos(n\theta)=x^N-(N/2)x^{N-2}y^2+(N/4)$, $$r^N\cos(N\theta)=x^N-\binom{N}{2}x^{N-2}y^2+\binom{N}{4}x^{N-4}y^4-\binom{N}{6}x^{N-6}y^6+K \quad (7a)$$

and $$r^N\sin(N\theta)=\binom{N}{1}x^{N-1}y-\binom{N}{3}x^{N-3}y^3+\binom{N}{5}x^{N-5}y^5-K \quad (7b)$$

where the binomial coefficients are given by $$\binom{N}{n}=\frac{N!}{(N-n)!n!}.$$

Substituting equation 7a and 7b into equation 5 and using the first three terms (N=3) yields:

$$\Phi(x,y)= \quad (8)$$

-continued $$\frac{A_1}{r_0}x+\frac{B_1}{r_0}y+\frac{A_2}{r_0^2}x^2-\frac{B_2}{r_0^2}y^2+\frac{A_3}{r_0^3}(x^3-3xy^2)+\frac{B_3}{r_0^3}(3x^2-y^3).$$

The coefficients can be determined from the electrode shapes. If the electrodes are hyperbolic sheets extending to infinity and are oriented along the x-axis and y-axis, then their shapes are determined by:

$$\frac{x^2}{r_0^2}-\frac{y^2}{r_0^2}=-1 \text{ for the electrodes along the } y\text{-axis} \tag{9a}$$

and $$\frac{x^2}{r_0^2}-\frac{y^2}{r_0^2}=+1 \text{ for the electrodes along the } x\text{-axis.} \tag{9b}$$

Using the electrodes as boundary conditions in equation 8 yields:

$$\Phi(x,y)=-\frac{1}{r_0^2}(x^2-y^2). \tag{10}$$

The general form of the quadrupole potential $V_t$ is:

$$V_t(x,y,t)=-\left[\frac{1}{r_0^2}(x^2-y^2)\right][U+V\cos[\Omega(t-t_n)]]. \tag{11}$$

The canonical form of the equations of motion for ions in an ideal quadrupole potential $V_t$ field can be obtained from the vector equation:

$$m\frac{\partial^2\vec{R}}{\partial t^2}+e\vec{\nabla}V_t=0 \tag{12}$$

where the position vector is $\vec{R}$(x, y, z), m is the ion mass and e is the charge of the ion. The form of the potential allows the independent separation of the equations of the ion motion into the x and y components:

$$\vec{E}_x=-\frac{\partial V_t}{\partial x}=+\frac{2x}{r_0^2}(U+V\cos[\Omega(t-t_n)]) \tag{13a}$$

$$\vec{E}_y=-\frac{\partial V_t}{\partial y}=-\frac{2y}{r_0^2}(U+V\cos[\Omega(t-t_n)]) \tag{13b}$$

$$\vec{E}_z=0. \tag{13c}$$

The canonical form of these equations when equations 13a–13c are substituted into equation 12 is:

$$\frac{d^2u}{d\zeta^2}+[a_u-2q_u\cos(2\zeta)]u=0 \tag{14}$$

which is the well known Mathieu equation, and where the dimensionless parameters ζ, $a_u$ and $q_u$ are:

$$\zeta=\frac{\Omega t}{2} \tag{15a}$$

$$\frac{d^2u}{dt^2}=\frac{\Omega^2}{4}\frac{d^2u}{d\zeta^2} \tag{15b}$$

$$q_u=\Psi_v 4eV/[mr_0^2\Omega^2] \tag{15c}$$

$$a_u=\Psi_v 8eU/[mr_0^2\Omega^2] \tag{15d}$$

where $\Psi_x$=+1 for u=x; and $\Psi_y$=−1 for u=y.

It can be seen that the Mathieu equation (equation 14) is a second order differential equation that has stable solutions characterized by the parameters $a_u$ and $q_u$. The values of these parameters define the operating point of the ion within the stability region (see, e.g., FIG. 3). The general solution to equation 14 is:

$$u(\zeta)=A\sum_{n=-\infty}^{+\infty}C_{2n}\cos(2n+\beta_u)\zeta+B\sum_{n=-\infty}^{+\infty}C_{2n}\sin(2n+\beta_u)\zeta \tag{16}$$

The secular frequency of the ion motion $\omega_n$ can be determined from the value of β:

$$\omega_n=\left(\frac{n^+}{\frac{\beta_u}{-2}}\right)\Omega \tag{17}$$

The value of $\beta_u$ is a function of the operating point in ($a_u$, $q_u$) space and can be computed from a well-known continuing fraction. See, e.g., March et al., *Quadrupole Storage Mass Spectrometry*, Wiley, New York (1991).

The lower stability region of ($a_u$, $q_u$) space shown in FIG. 3 shows the independent stable region for x and y motions. Ions must be stable in both the x- and y-directions simultaneously in order to be trapped. Therefore, only operating points corresponding to ($a_x$, $q_x$) and ($a_y$, $q_y$) that are in overlapping regions of stability can be used. As shown in FIG. 3, these regions are bounded in the x-direction by $\beta_x$=0 and $\beta_x$=1 and in the y-direction by $\beta_y$=0 and $\beta_y$=1.

Referring now to FIG. 2B, if an additional alternating potential δ is added to electrode 110 in phase with the fundamental potential V1 and is subtracted from electrode 112, then the coefficients in equation 8 will change. Application of the boundary conditions to equation 8 yields the following expression for the potential:

$$\Phi(x, y) = \frac{\delta\left(\frac{1}{2\sqrt{2}}+1\right)}{r_0} y - \frac{V}{r_0^2}(x^2 - y^2) + \frac{\delta}{2\sqrt{2}\, r_0^3}(3x^2 y - y^3). \quad (18)$$

The general form of the new potential $V_t$, in which the DC potential U and the initial phase of the fundamental alternating potential $t_n$ are zero, is:

$$V_t(x, y, t) = \left[\frac{\delta\left(\frac{1}{2\sqrt{2}}+1\right)}{r_0} y - \frac{V}{r_0^2}(x^2 - y^2) + \frac{\delta}{2\sqrt{2}\, r_0^3}(3x^2 y - y^3)\right]\cos(\Omega t). \quad (19)$$

Taking only the first two terms for now and substituting them into equations 13a and 13b yields the instantaneous electric field acting on an ion in the axial direction due to the potential field $V_t$ as follows:

$$E_x = -\frac{\partial V_t}{\partial x} = +\frac{2x}{r_0^2} V\cos(\Omega t) \text{ and} \quad (20a)$$

$$E_y = -\frac{\partial V_t}{\partial y} = -\frac{2y}{r_0^2} V\cos(\Omega t) - \frac{\delta\left(\frac{1}{2\sqrt{2}}+1\right)}{r_0}\cos(\Omega t). \quad (20b)$$

The equation of the ion motion in the y direction becomes:

$$m\frac{d^2 y}{dt^2} = \left(\frac{-e2yV}{r_0^2} - \frac{e\delta\left(\frac{1}{2\sqrt{2}}+1\right)}{r_0}\right)\cos(\Omega t). \quad (21)$$

Substituting $\zeta=\Omega t/2$, the following equation is obtained:

$$\frac{d^2 y}{dt^2} = \frac{\Omega^2}{4}\frac{d^2 y}{d\zeta^2} \quad (22)$$

By substitution of equation 22 in equation 21 and deriving the expression $2\zeta=\Omega t$ from equation 15a, the basic equation of the ion motion in they direction is obtained:

$$\frac{d^2 y}{d\zeta^2} - 2\left(\frac{-4\text{eV}}{m r_0^2 \Omega^2} y - \frac{2e\delta\left(\frac{1}{2\sqrt{2}}+1\right)}{m\Omega^2 r_0}\right)\cos(2\zeta) = 0. \quad (23)$$

Defining:

$$q_y = \frac{-4\text{eV}}{m\Omega^2 r_0^2} \text{ and} \quad (24a)$$

-continued $$q_{yD} = \frac{-2e\delta\left(\frac{1}{2\sqrt{2}}+1\right)}{m\Omega^2 r_0} \quad (24b)$$

and by substitution of equations 24a and 24b into equation 23, an equation similar to the Mathieu equation is obtained:

$$\frac{d^2 y}{d\zeta^2} - 2(q_y y + q_{yD})\cos(2\zeta) = 0 \quad (25)$$

Using the following definition and substitution: $u=(q_y y+q_{yD})$ and $$\frac{d^2 u}{d\zeta^2} = q_y \frac{d^2 y}{d\zeta^2}$$

into equation 25 yields the following form of the Mathieu equation:

$$\frac{d^2 u}{d\zeta^2} - 2q_y u\cos(2\zeta) = 0. \quad (26)$$

Therefore, the axial displacement of the ion is found to be the sum of two terms:

$$y = \frac{u - q_D}{q_y} = \frac{u}{q_y} - \frac{q_D}{q_y}. \quad (27)$$

The first term represents the normal time dependent oscillatory solution $u(\zeta)$ as in equation 16. The second term in equation 27 is an additive offset value which expresses the displacement of the ion along the y-axis due to the dipole:

$$-\frac{q_D}{q_y} = \frac{-\delta\left(\frac{1}{2\sqrt{2}}+1\right) r_0}{2V}. \quad (28)$$

During mass analysis it is common to increase the AC voltage of the guiding field as a function of mass. In the special case in which $\delta=\eta V_{ac}$, equation 28 becomes:

$$-\frac{q_D}{q_y} = -\left(\frac{1}{2\sqrt{2}}+1\right)\frac{r_0}{2}\eta \quad (29)$$

and thus:

$$y = \frac{u}{q_y} - \left(\frac{1}{2\sqrt{2}}+1\right)\frac{r_0}{2}\eta. \quad (30)$$

Therefore, when the dipole is properly phased and present as a constant fraction ($\eta$) of the trapping field, it can be seen from equation 30 that the ion motion is uniformly displaced along the y-axis by a constant amount. As indicated previously with respect to embodiments of linear ion trap apparatus 100, application of this trapping field dipole (TFD) results in an asymmetrical trapping field. The magnitude and sign of the displacement are independent of the mass-to-charge ratio and the polarity of the ion charge. The displacement depends only on the percentage ($\eta$) of dipole and the geometric dimensions of the electrode structure. It will be noted that the direction of the displacement can be altered by changing the phase of the dipole from 0 to $\pi$.

If all three terms of the potential expressed in equation 18 are included in equation 12, the equations of motion now become:

$$m\frac{\partial^2 x}{\partial t^2} + e\left(-\frac{2x}{r_0^2} + \frac{6\left(\frac{\delta}{V}\right)xy}{2\sqrt{2}\,r_0^3}\right)V\cos(\Omega t) = 0 \tag{31a}$$

and $$m\frac{\partial^2 y}{\partial t^2} + e\left(\frac{\left(\frac{\delta}{V}\right)\left(\frac{1}{2\sqrt{2}} + 1\right)}{r^0} + \frac{2y}{r_0^2} + \frac{3\left(\frac{\delta}{V}\right)(x^2 - y^2)}{2\sqrt{2}\,r_0^3}\right)V\cos(\Omega t) = 0. \tag{31b}$$

The three terms in brackets in equation 31b are the dipole, quadrupole, and hexapole components, respectively. Since equations 31a and 31b each contain terms that are not exclusively functions of the x- or y-coordinates, the motions in these respective directions are coupled. Rearranging equations 31a and 31b and substituting equations 15a–15d yield:

$$\frac{d^2 x}{d\zeta^2} - 2q_x x\cos(2\zeta)x = -\left(\frac{12e\left(\frac{\delta}{V}\right)}{m\,\Omega^2 r_0^3\sqrt{2}}\right)(xy)\cos(2\zeta) \tag{32a}$$

and $$\frac{d^2 y}{d\zeta^2} - 2q_y\cos(2\zeta)y = -\frac{4e}{m\Omega^2 r_0^2}\left(r_0\left(\frac{\delta}{V}\right)\left(\frac{1}{2\sqrt{2}} + 1\right) + \frac{3\left(\frac{\delta}{V}\right)(x^2 - y^2)}{2r_0\sqrt{2}\,r_0}\right)\cos(2\zeta) \tag{32b}$$

which are now forms of the driven Mathieu equation, with the driving force appearing on the right side of the expressions.

The solutions to coupled nonlinear equations of the type of equations 32a and 32b are known from the theory of nonlinear betatron oscillations in alternating gradient circular accelerators and their mechanical analog. See generally Barbier et al., *CERN Technical Report* 58-5 (1958); R. Hagedorn, CERN *Technical Report, Parts I & II,* 57-1 (1957); H. Goldstein, *Classical Mechanics*, Addison-Wesley (1965); and Wang, *Rapid Commun. In Mass Spectrom.,* 7 (1993) 920. The higher-order geometrical terms in equations 32a and 32b produce singularities in the denominator of the solutions, thus indicating nonlinear resonances. An ion at the operating point ($a_u$, $q_w$) corresponding to a nonlinear resonance will cause the amplitude of oscillation of the ion to increase without bounds in the direction of an electrode. The increase in amplitude with time is not linear as with simple dipole resonance ejection, but rather increases at a rate depending on the order of the nonlinear resonance. Nonlinear resonances will occur at the operating points having the relationship:

$$\beta_y n_y + n_x\beta_x = 2v \tag{33}$$

where $|n_y|+|n_x|=N$. Therefore, since $\omega=(\beta/2)\Omega$ and for v=1:

$$\Omega\frac{\beta_y}{2}K + (N-K)\Omega\frac{\beta_x}{2} = \Omega \tag{34a}$$

or $$\omega_y K + (N-K)\omega_x = \Omega \tag{34b}$$

where K=N, N−2, N−4. Thus, the third order resonances (N=3) generated in the field are:

$$\beta_y = 2/3,\ K=3 \tag{35a}$$

a pure resonance affecting only the (y) coordinate, and $$\beta_y/2+\beta_x=1,\ K=1, \tag{35b}$$

a coupled resonance affecting both the x- and y-coordinates (shown as dashed lines in FIG. 3).

Thus, it is seen that the linear trapping field has a nonlinear resonance at $\beta_y=2/3$ similar to the three-dimensional field known in the prior art. See U.S. Pat. No. 5,714,755 to Wells et al. As indicated previously with respect to embodiments of linear ion trap apparatus 100, this nonlinear resonance can be used to eject ions in the direction of one of the electrodes. If an additional alternating potential (e.g., V2 of FIG. 2C) is applied between two opposing electrodes (e.g., electrodes 110 and 112 of FIG. 2C) at the frequency of ion oscillation in the trapping field, ions will be displaced in the direction of one of these electrodes 110 or 112—for example, electrode 110A in FIGS. 4–6 that has an aperture 132 through which the ejected ion can be directed to an appropriate ion detector.

Equations 35a and 35b indicate that an ion at the operating point corresponding to $\beta_y=2/3$ (equation 35a) along the $q_y$ axis of the stability region (i.e., $a_y=0$ when the DC potential U=0) will also correspond to a coupled resonance corresponding to $\beta_x=2/3$ (equation 35b), which is shown as point $P_1$ in FIG. 3. Therefore, the two resonances are degenerate at this operating point, unlike the case of a three-dimensional trap. It is undesirable for an ion to be located at $\beta_x=2/3$ since at this operating point, an increase in amplitude in the y-direction will cause an increase in amplitude in the x-direction due to the coupled resonance. However, as indicated previously, if a small DC potential is added to the trapping field, the operating point can be shifted from the q, axis (where U=0) down to the operating point $P_2$ in FIG. 3. The two nonlinear resonance lines are no longer degenerate at this new operating point $P_2$ and a pure $\beta_y=2/3$ resonance will be encountered before the coupled resonance. As also indicated previously, if a supplemental alternating potential (e.g., V2 in FIG. 2C) is applied across opposing electrodes at a frequency corresponding to the operating point $P_2$ in FIG. 3, then an increase in amplitude of the y-coordinate oscillations will occur without a concomitant increase in the x-coordinate oscillation.

Equations 15c and 15d indicate that if the ratios of V/m and U/m remain constant in time, then the operating parameters $a_u$ and $q_u$ will also remain constant in time. Mass scanning can be effected by causing ions of successive mass-to-charge ratios to pass through the same a-q operating point linearly in time. Increasing the amplitude of the fundamental trap frequency V (e.g., V1 in FIGS. 2A–2C) and the DC amplitude U linearly in time, such that their ratio V/U is constant, will result in ion ejection that is a linear function of m/z. As demonstrated above, it is advantageous that the operating point ($a_y$, $q_y$) for ejection correspond to $\beta_y$=⅔, although it will be understood that the subject matter disclosed herein is not limited to operation along any one iso-beta line or at any other specific location in a-q space. A supplemental resonance frequency corresponding to the fundamental frequency ω or one of the sidebands (e.g., Ω−ω) will result in an increase in the amplitude of the ion oscillation due to both the supplemental dipole resonance and the nonlinear hexapole resonance of the trapping field, thereby effecting ion ejection through a slot in one of the electrodes (e.g., aperture 132 of electrode 110A in FIGS. 4–6).

EXPERIMENTAL RESULTS

Figure 7A:
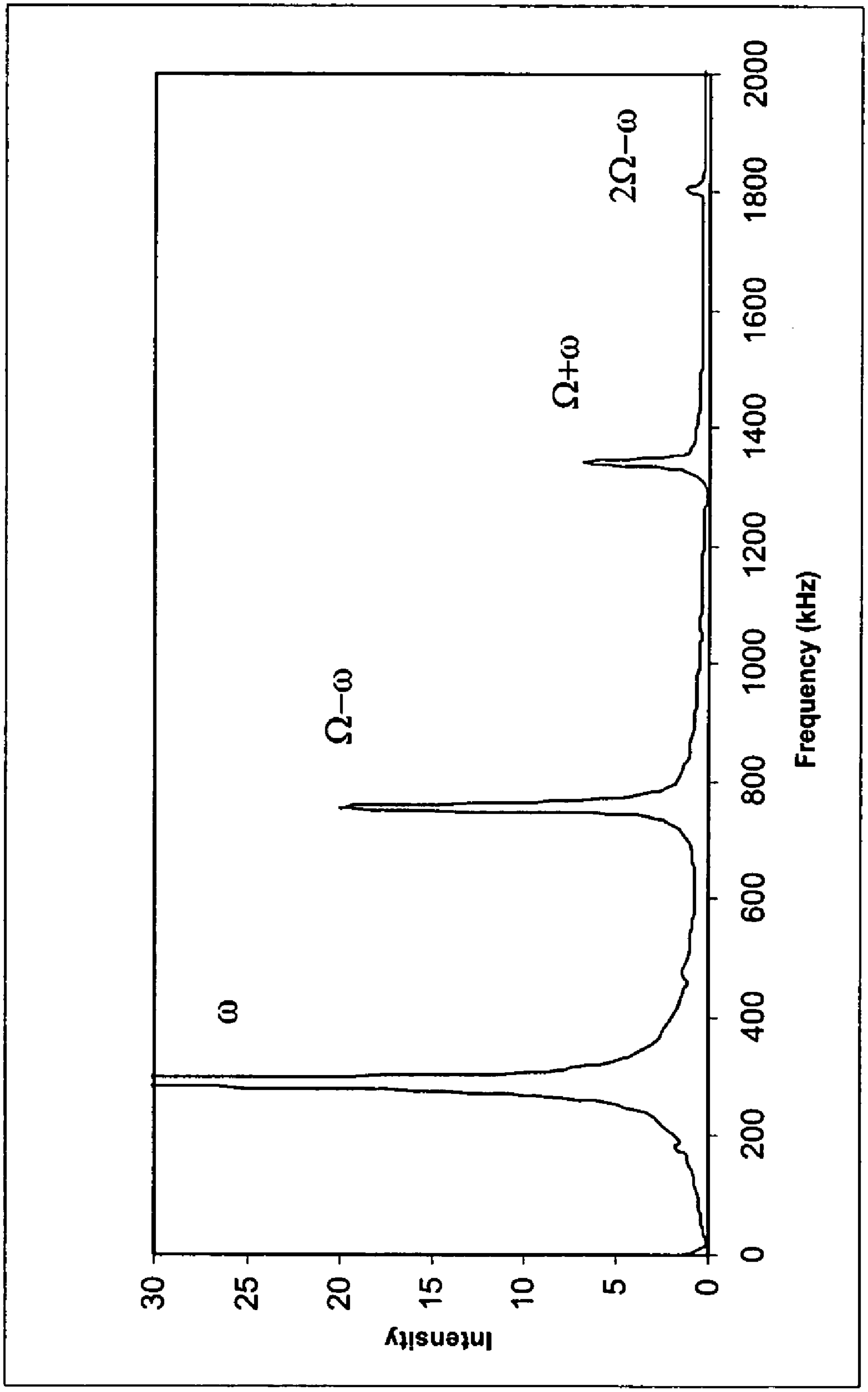
FIG. 7A illustrates a Fast Fourier Transform (FFT) analysis of x-coordinate motion of an ion in a linear ion trap apparatus with an asymmetrical trapping field according to the subject matter disclosed herein, with no trapping field dipole (TFD) applied to electrodes of the apparatus.
Figure 7B:
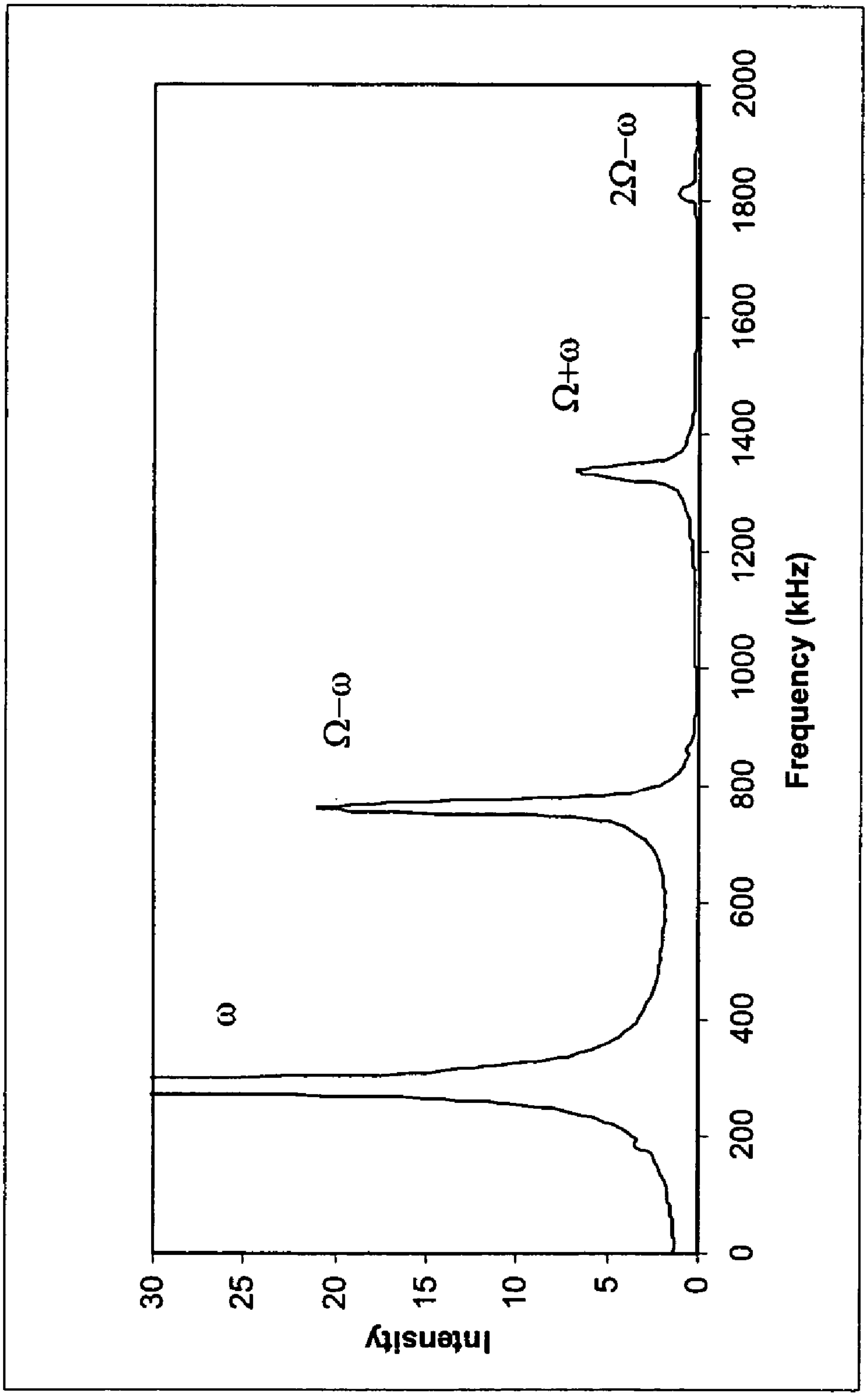
FIG. 7B illustrates an FFT analysis of y-coordinate motion under the same experimental conditions as in FIG. 7A.

The trajectories of an ion of m/z=100 confined in a linear ion trap with an asymmetric trapping field were computed using the ion simulation program SIMION developed at the Idaho National Engineering and Environmental Laboratory, Idaho Falls, Id. The trapping field dipole (TFD=δ/V) was 0%, the DC component of the trapping field was zero (U=0), the trap frequency was 1050 kHz, and the operating point of the ion in the stability diagram of FIG. 3 was $\beta_y$=0.51. FIGS. 7A and 7B illustrate a Fast Fourier Transform (FFT) analysis of the component of ion motion in the x- and y-directions, respectively, obtained by Fourier analysis of 4000 data points of the ion trajectory, when there is no TFD (δ/V=0%) applied to the electrodes. The frequency spectrum ranges from 0 to 2000 kHz, and the fundamental secular frequency ω of the ion motion is observed at approximately 280 kHz. Only the fundamental frequency ω and the sideband frequencies Ω−ω and Ω+ω are present in the ion motions.

Figure 8A:
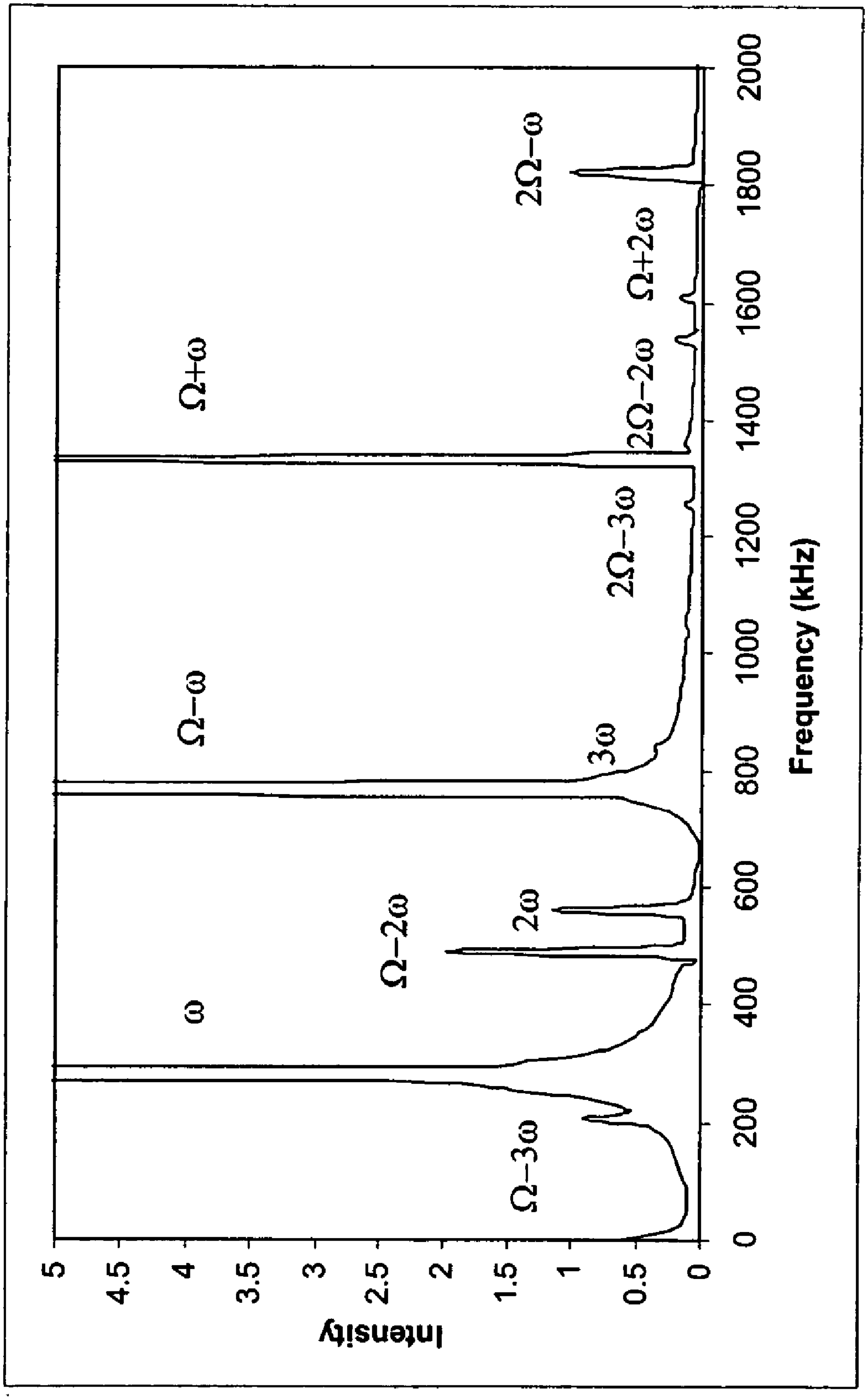
FIG. 8A illustrates an FFT analysis of x-coordinate motion of an ion in a linear ion trap apparatus with an asymmetrical trapping field according to the subject matter disclosed herein, with a 30% TFD applied to electrodes of the trap structure.
Figure 8B:
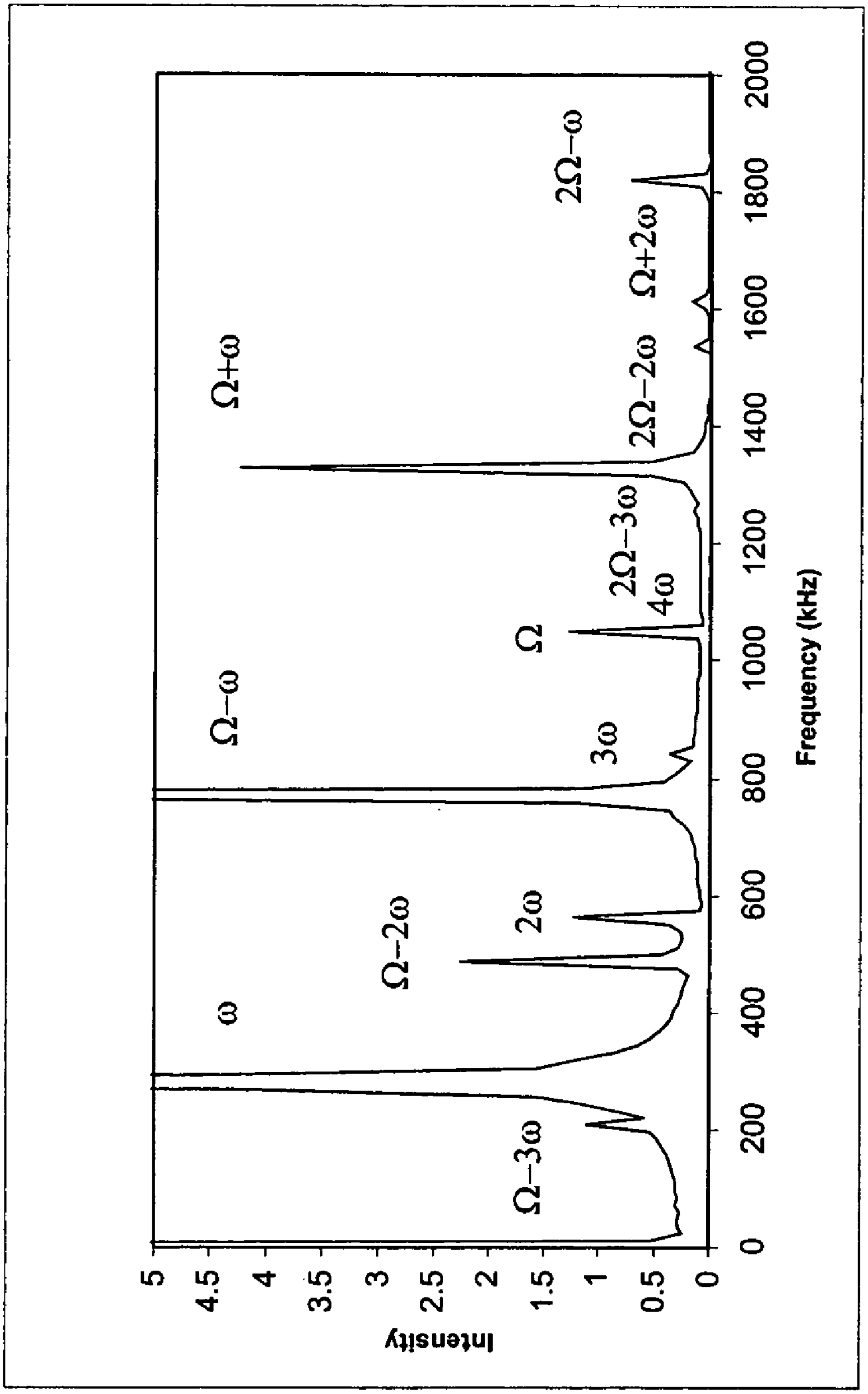
FIG. 8B illustrates an FFT analysis of y-coordinate motion under the same experimental conditions as in FIG. 8A.

By comparison, FIGS. 8A and 8B illustrate an FFT analysis of the component of ion motion in the x- and y-directions, respectively, when there is a 30% TFD applied to the electrodes. The TFD introduces a hexapole component in the trapping field and therefore, in addition to the fundamental frequency ω and the side band frequencies Ω−ω and Ω+ω, there are overtones in the ion motions present at 2ω, 3ω and 4ω, as well as sidebands of higher harmonics. A nonlinear resonance occurs at an operating point if the harmonics of the ion's motional frequencies match sideband frequencies. The matching will occur for entire groups of harmonics and sidebands. It should be noted that the drive frequency Ω is observed in the y-direction motions, but not in the x-direction motions. This is consistent with an odd-order multipole in the field in the y-direction but not in the x-direction. Thus, ions can be ejected from the trap in a single desired direction.

Figure 9:
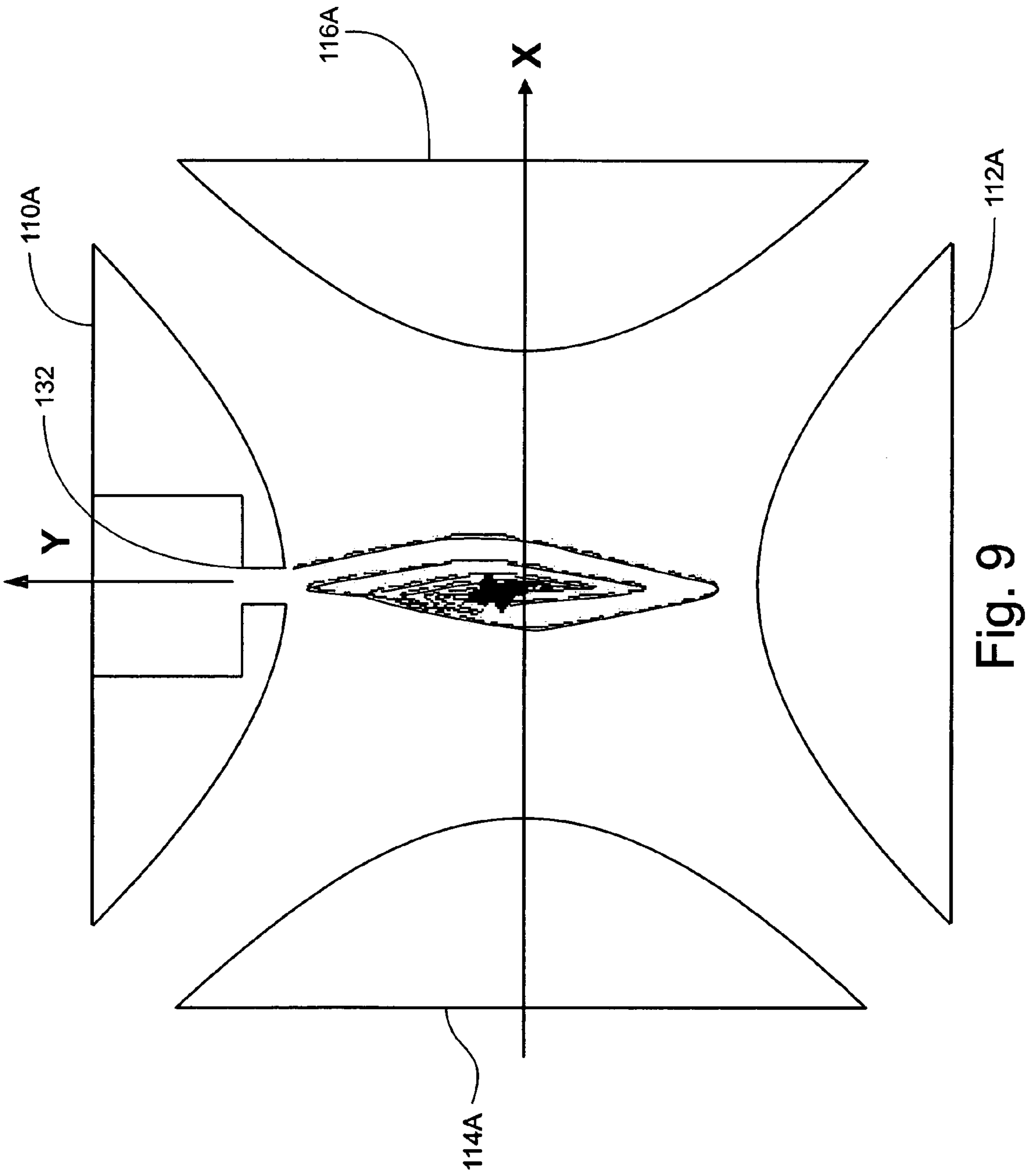
FIG. 9 is a cross-sectional view in an x-y plane of a linear ion trap apparatus illustrating a simulation of ion motion corresponding to scanning through operating point $P_1$ in the stability diagram of FIG. 3.

FIG. 9 illustrates a simulation of ion motion corresponding to scanning through the operating point $P_1$ in FIG. 3. The excursions of the ion in the x-y plane are confined as a result of the quadrupolar trapping field. A 30% TFD is applied to electrode pair 110A, 112A, resulting in an asymmetrical trapping field with displacement along the y-axis relative to the geometric center of the trap. The offset trapping field center is evidenced by the path of the ion in FIG. 9. The ion is being driven in the y-direction by both the supplemental resonant field (700 kHz corresponding to $a_y$=0 and $q_y$=0.7846; i.e., $\beta_y$=⅔) as well as the pure and coupled nonlinear resonances. The ion is being driven in the x-direction only by the coupled resonance. The result is an increase in the coordinates in both the x- and y-directions with a significant displacement in the transverse direction at the time the ion approaches the electrode.

Figure 10:
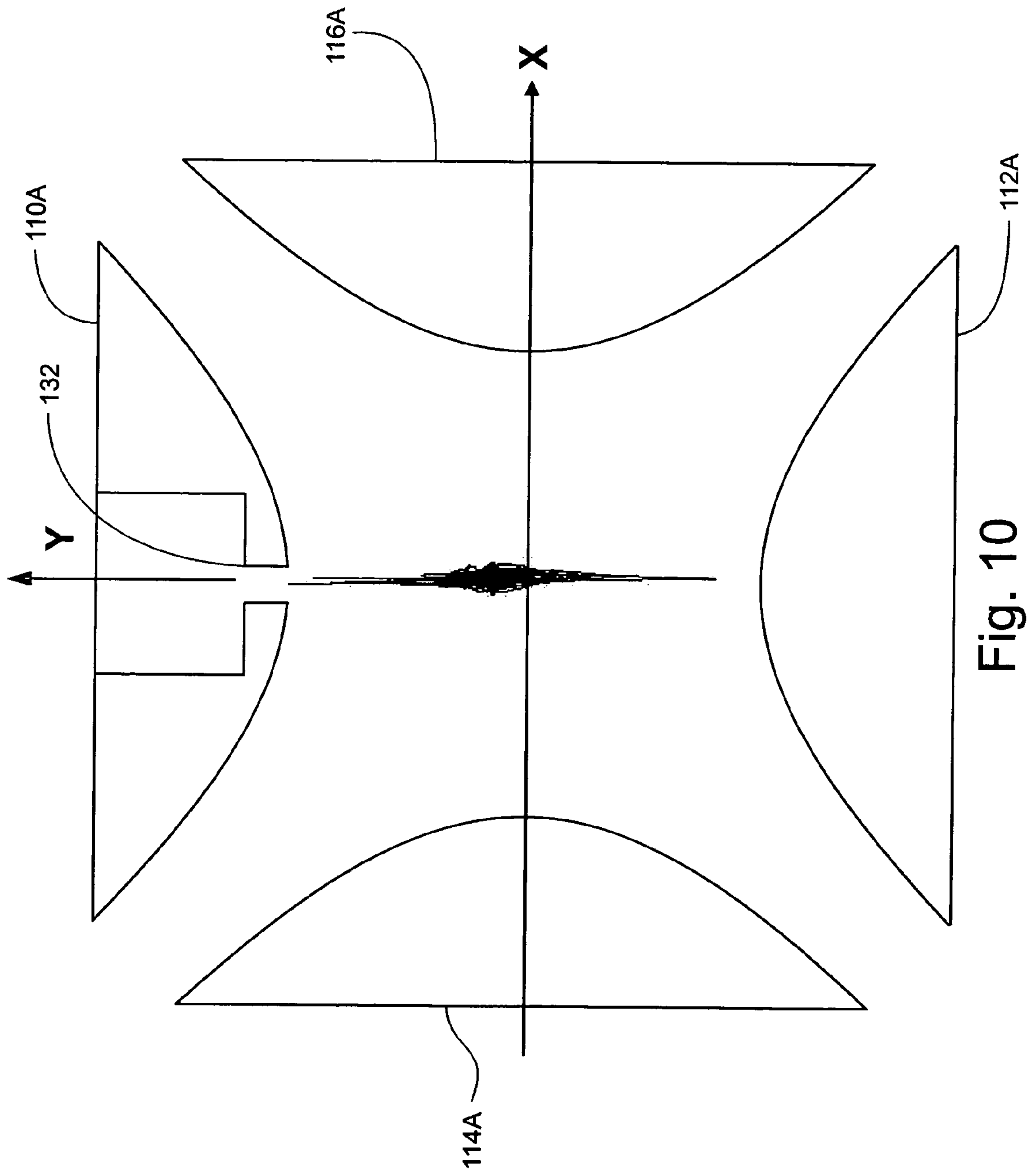
FIG. 10 is a cross-sectional view in an x-y plane of a linear ion trap apparatus illustrating a simulation similar to FIG. 9, but where a 5-volt DC potential has been added to the electrode pair arranged along the y-direction, such that the ion motion corresponds to scanning through operating point $P_2$ in the stability diagram of FIG. 3.

By comparison, FIG. 10 illustrates a simulation of ion motion under similar operating conditions as in FIG. 9, but when a 5-volt DC potential is added to the electrode pair oriented in the y-direction (e.g., electrode pair 110A, 112A) so that the operating point corresponds to point $P_2$ in FIG. 3 ($a_y$=0.03 and $q_y$=0.75; i.e., $\beta_y$=⅔). Advantageously, no significant increase in ion motion in the transverse direction is observed at this operating point. Thus, for a linear ion trap operating under the conditions simulated in FIGS. 9 and 10, assuming that ions are to be ejected in a direction along the y-axis, the efficiency of ion ejection in the desired y-direction is improved by operating at point $P_2$ (FIG. 10) as compared with point $P_1$ (FIG. 9).

Figure 11A:
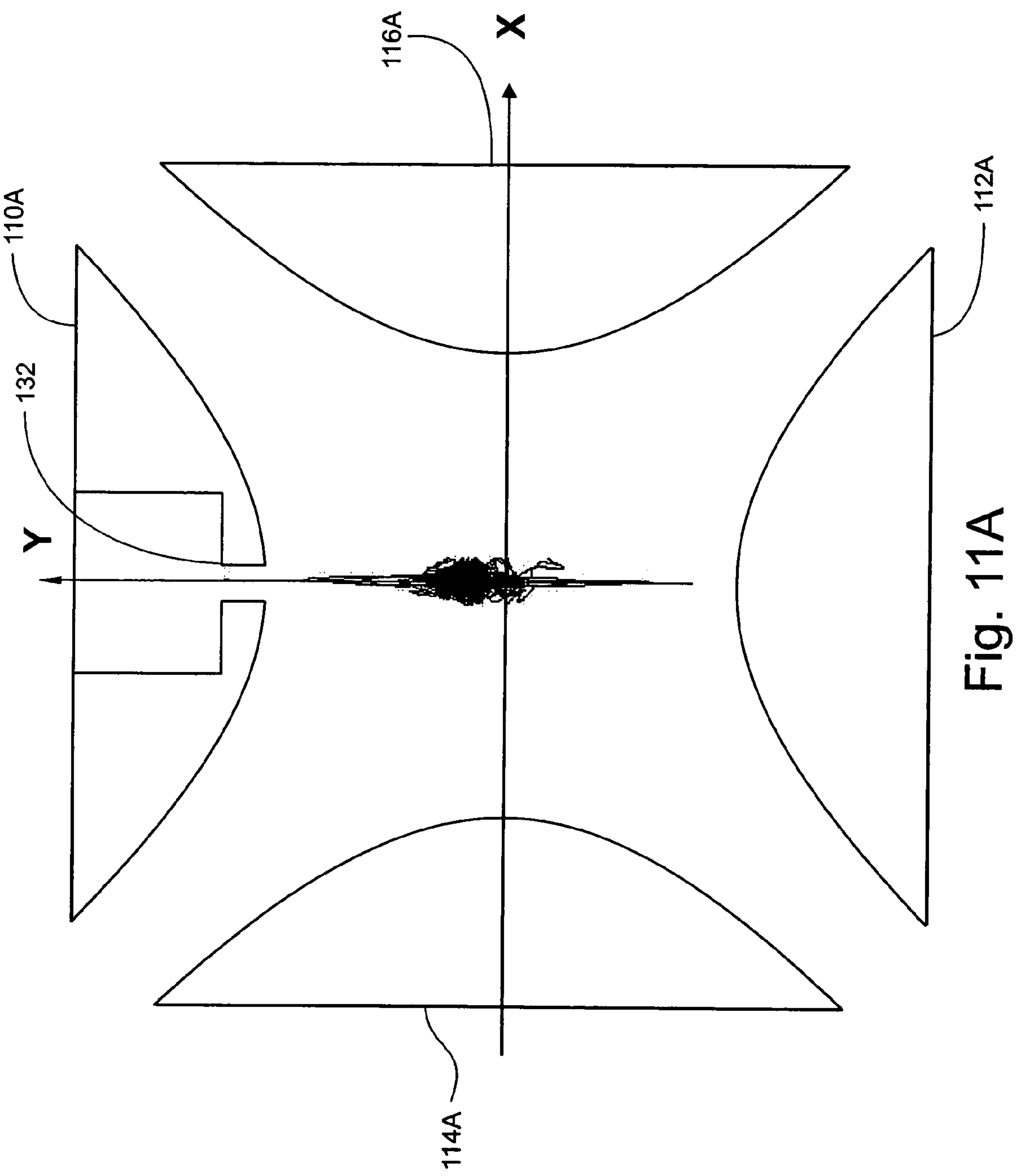
FIG. 11A is a cross-sectional view in an x-y plane of a linear ion trap apparatus with an applied asymmetrical trapping field, illustrating the ejection of an ion through an aperture of an electrode of the apparatus.
Figure 11B:
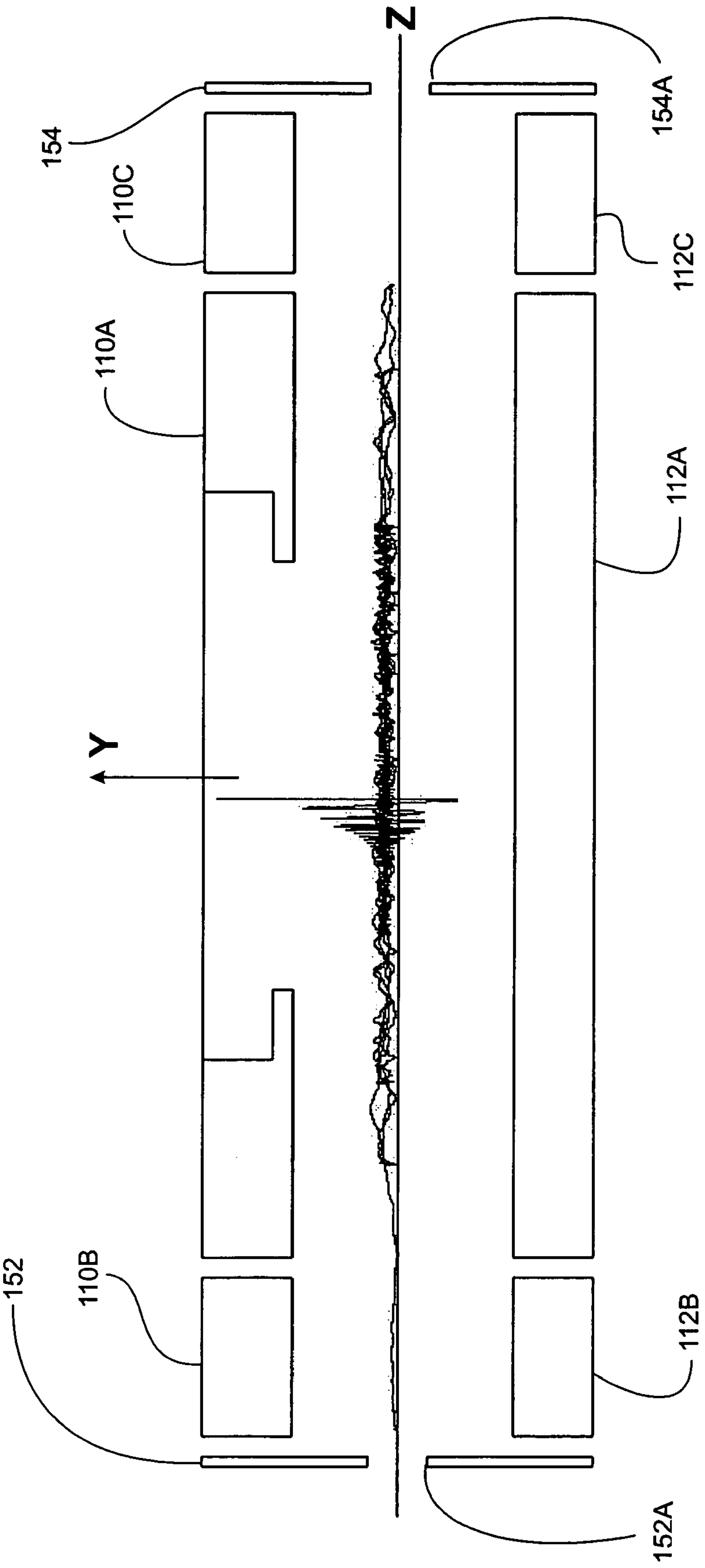
FIG. 11B is a cross-sectional side view of the apparatus illustrated in FIG. 11A, further showing the path of ion as it enters the apparatus along a geometric center axis of the apparatus and is moved off this axis due to application of the asymmetrical trapping field.

FIG. 11A illustrates a single ion simulation in a linear ion trap in which the ion is ejected at $\beta_y$=⅔ due to the combined effect of a resonant dipole at the first sideband frequency with excitation at Ω−ω=700 kHz and the nonlinear resonance. The displacement of the ion motion due to the 30% TFD can be observed. The ion is ejected along the y-axis through an aperture 132 formed in electrode 110A.

FIG. 11B illustrates the same simulation as depicted in FIG. 11A, but from the perspective of a cross-sectional side view of the ion trap. FIG. 11B shows the ion entering from the left side through aperture 152A of front plate 152 along the central z-axis, and then moving off the central axis as the ion enters the center electrode set (e.g., 110A, 112A, 114A, 116A in FIG. 11A) due to the establishment of the asymmetric trapping field. The ion undergoes collision damping due to the presence of a damping gas, and finally is ejected up through exit aperture 132 of center electrode 110A by resonant ejection as described previously. The confinement of ion motion in the axial z-direction along the length of the center electrode set due to properly adjusted DC voltages can also be clearly observed.

Figure 12A:
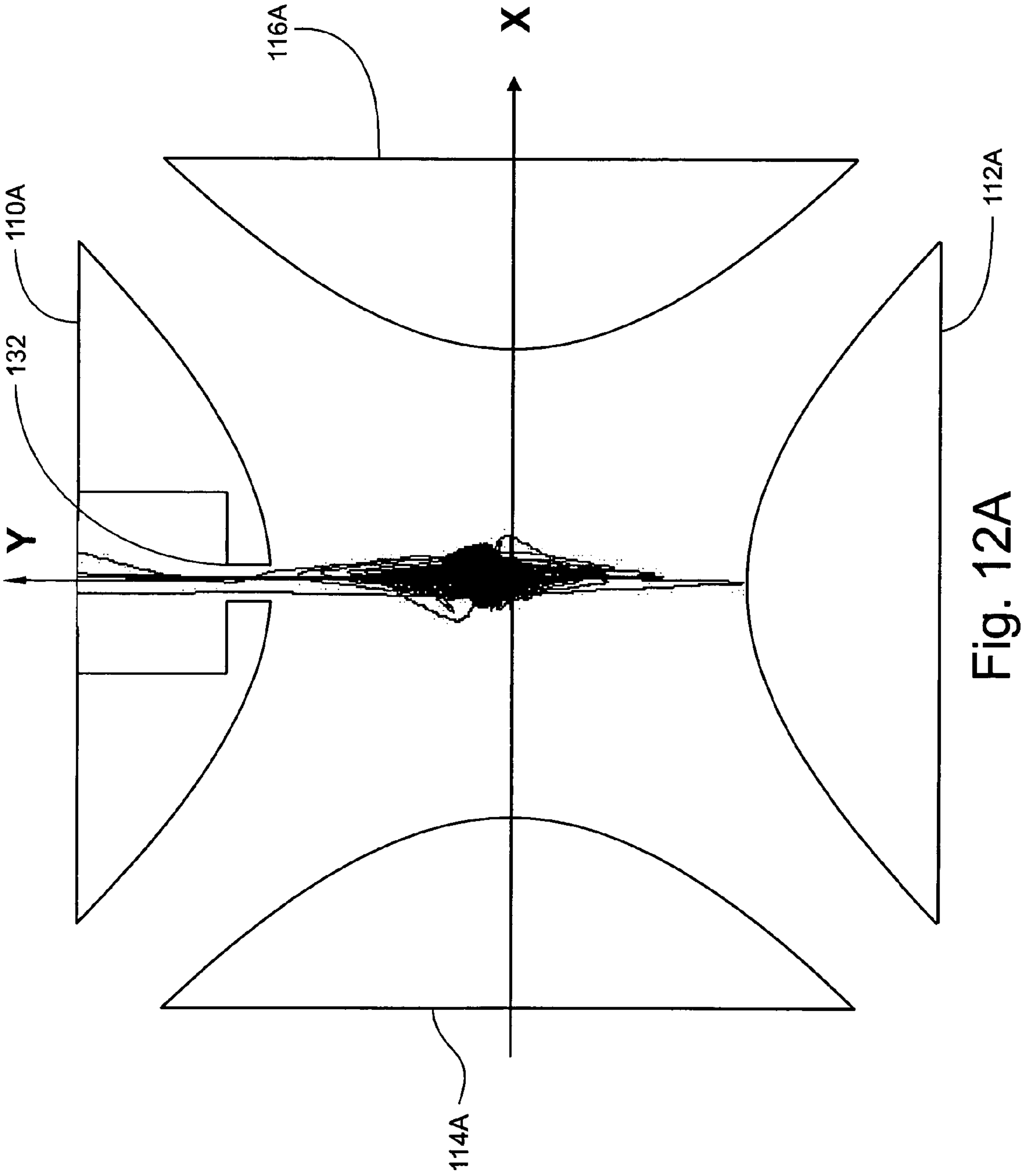
FIG. 12A is a cross-sectional view in an x-y plane of a linear ion trap apparatus according to simulated conditions similar to that illustrated in FIG. 11 A, but illustrating the excursions of nine ions.
Figure 12B:
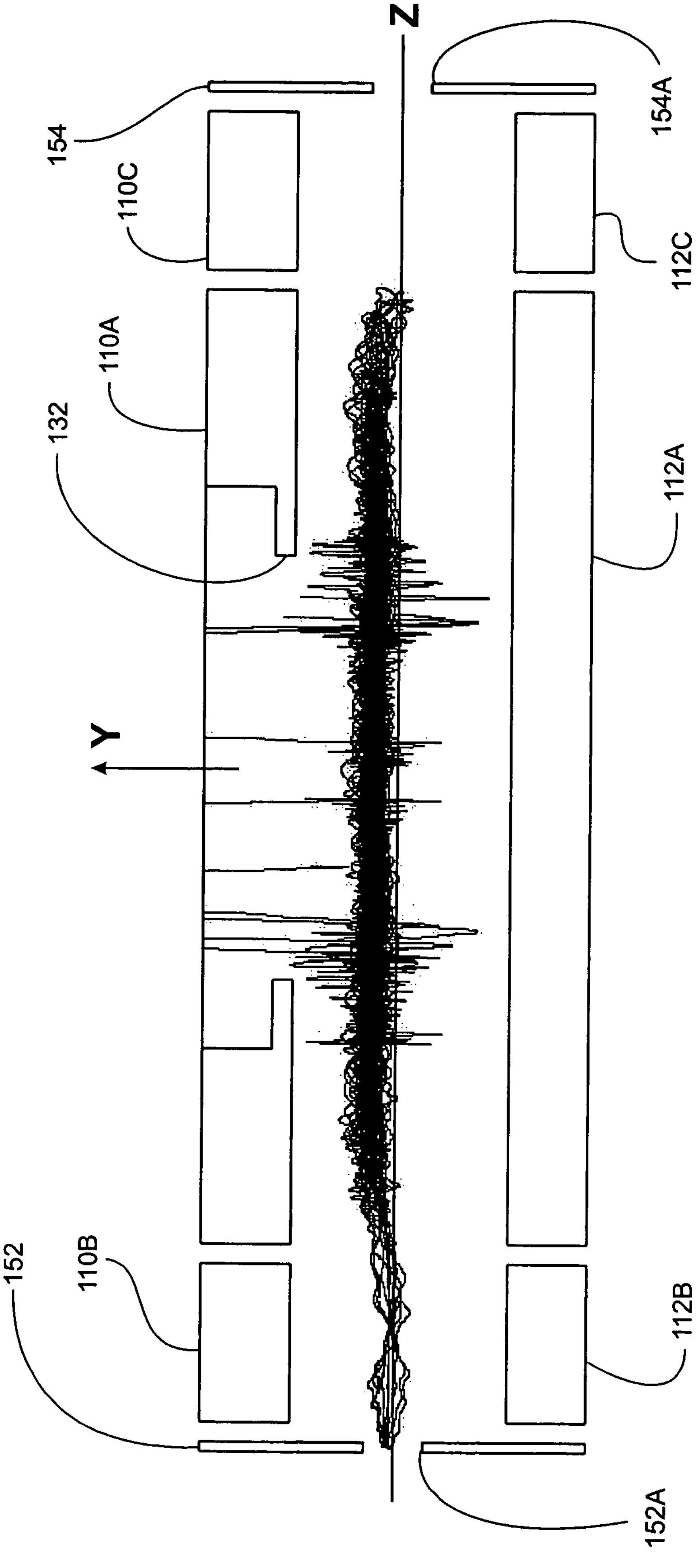
FIG. 12B is a cross-sectional side view of the apparatus illustrated in FIG. 12A and is similar to FIG. 11B, but illustrating the excursions of nine ions.

FIGS. 12A and 12B show a simulation similar to FIGS. 11A and 11B, but with a total of nine ions entering the linear ion trap apparatus 100 at random phases of the main RF trapping potential.

Figure 13:
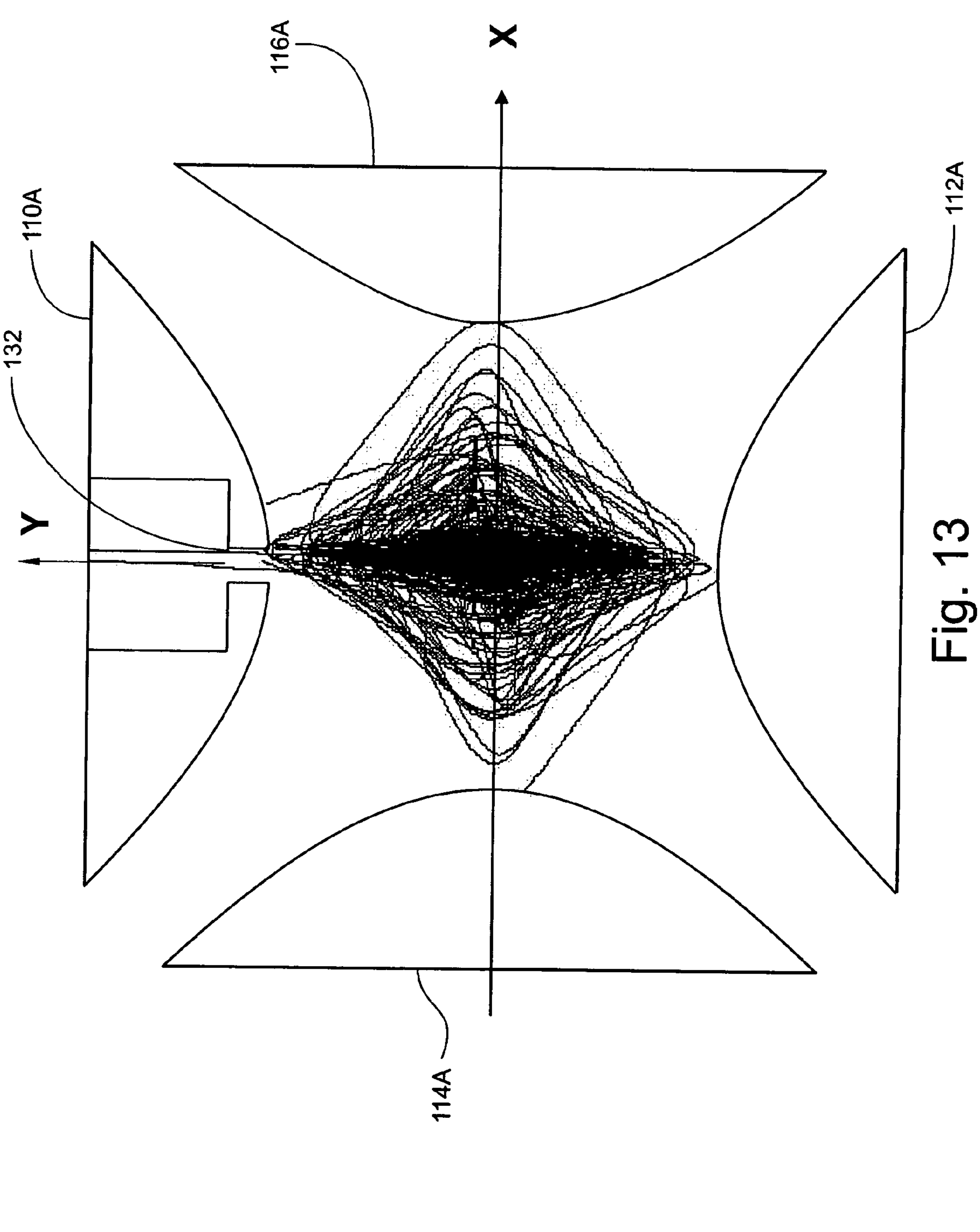
FIG. 13 a cross-sectional view in an x-y plane of a linear ion trap apparatus similar to FIG. 11A, but in a case where no TFD is applied and a supplemental electrical dipole is applied.

FIG. 13 illustrates a simulation of nine ions without a TFD present (δ/V=0%), but with a supplemental dipole V2 (see FIG. 2C) applied having an amplitude of 12 volts, which is just above the threshold voltage for ion ejection when damping gas is present. It can be seen that not all of the ions are ejected along the y-direction; many are ejected in the x-direction.

Figure 14A:
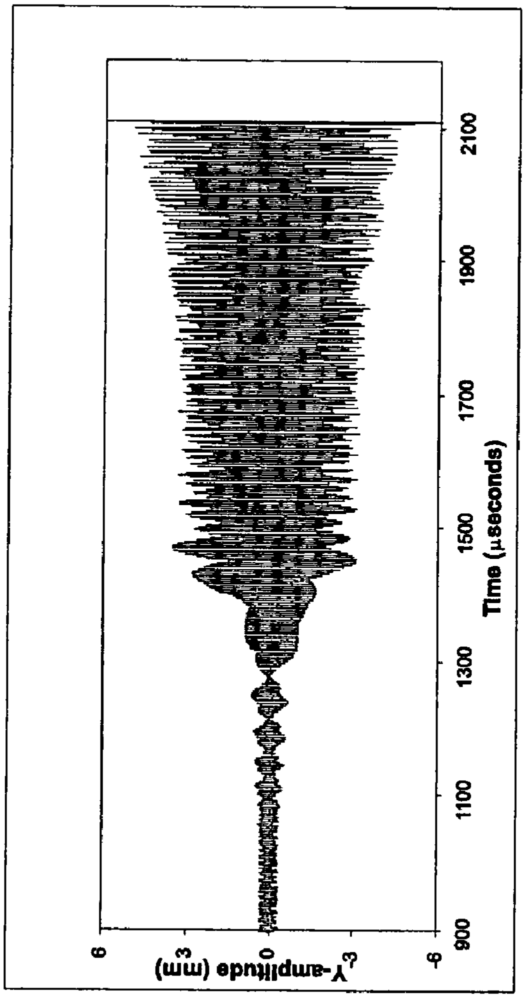
FIG. 14A illustrates a plot of y-coordinate ion motion as a function of time in a linear ion trap apparatus with no TFD applied, no collisional damping, and a 2-volt supplemental dipole voltage applied.
Figure 14B:
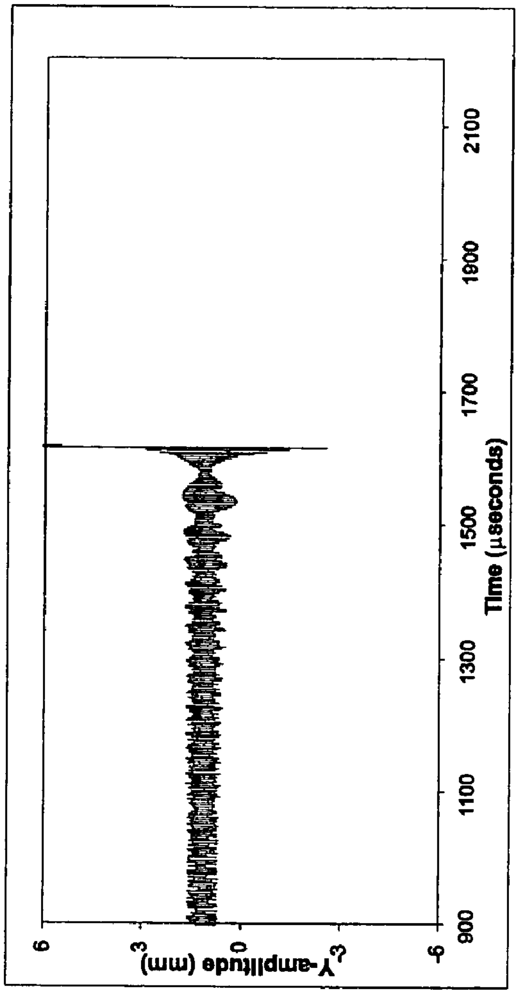
FIG. 14B illustrates a plot of y-coordinate ion motion as a function of time in a linear ion trap apparatus operating under conditions similar to FIG. 14A, but illustrating the ejection of an ion when a 30% TFD is applied.

FIG. 14A illustrates a plot of the y-coordinate amplitude of ion motion as a function of time in a linear quadrupole ion trap with 0% TFD, no collisional damping, and 2 volts of supplemental dipole voltage V2. The ions are excited at $\beta_y$=⅔ (see FIG. 3) but they are not ejected until the y stability boundary ($\beta_y$=1) is reached due to the small supplemental potential applied and the absence of the nonlinear resonance. By comparison, FIG. 14B shows the significantly faster ejection of the ion when a 30% TFD is applied.

Figure 15A:
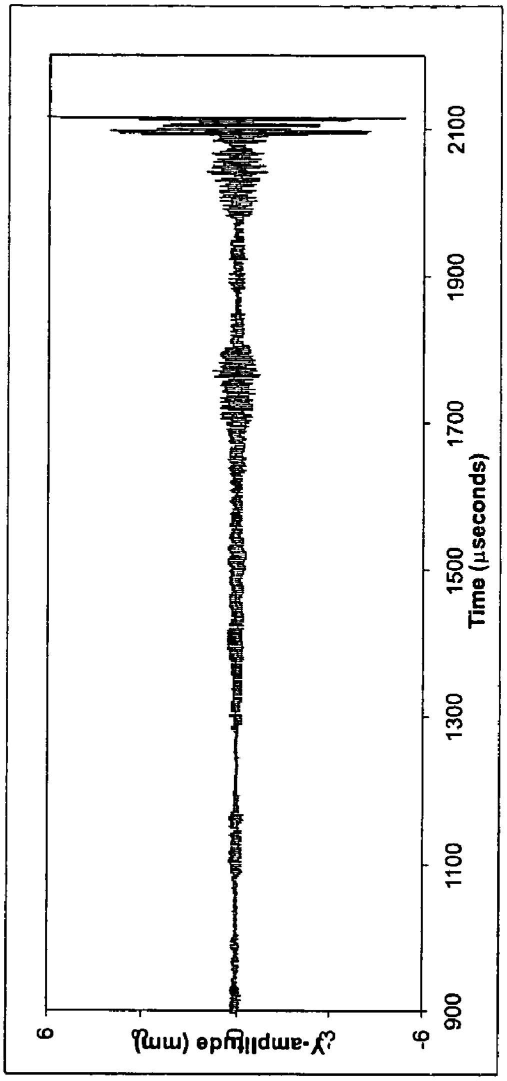
FIG. 15A illustrates a plot of y-coordinate ion motion as a function of time with no TFD applied, no collisional damping, and no supplemental dipole voltage applied.
Figure 15B:
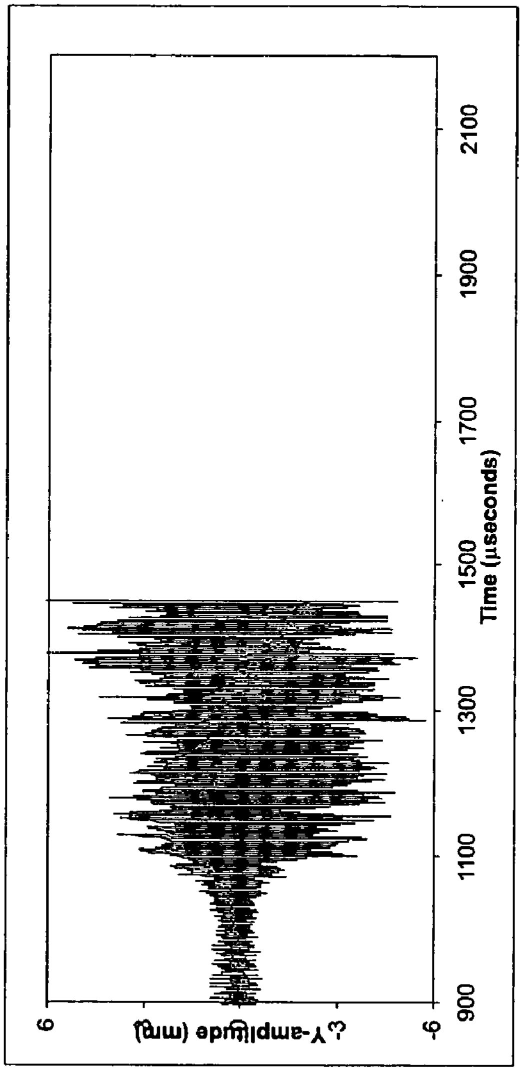
FIG. 15B illustrates a plot of y-coordinate ion motion as a function of time under conditions in which an ion is ejected due to application of a 20-volt supplemental dipole resonant potential.
Figure 15C:
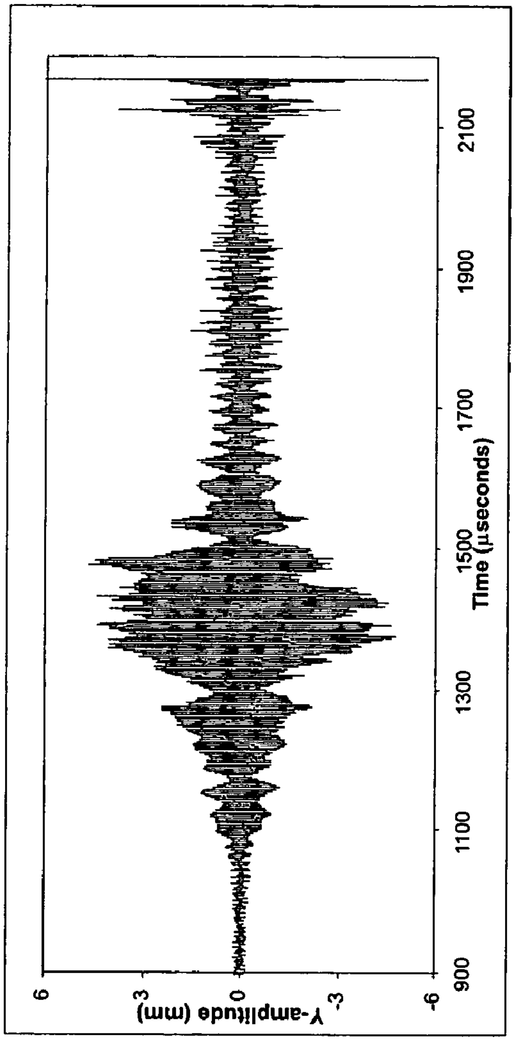
FIG. 15C illustrates a plot of y-coordinate ion motion as a function of time under conditions in which the dipole has been reduced to 10 volts and collisional damping acts to prevent ion ejection.
Figure 15D:
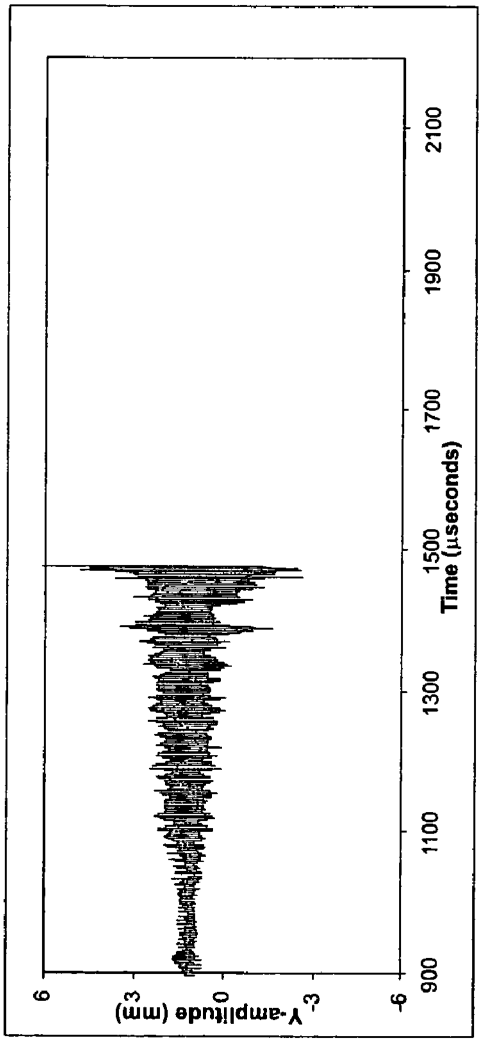
FIG. 15D illustrates a plot of y-coordinate ion motion as a function of time under conditions in which the dipole has been reduced to 10 volts, but where a TFD of 30% has been applied, resulting in ion ejection due to fulfillment of a nonlinear resonance condition.

FIG. 15A illustrates another plot of the y-coordinate amplitude of ion motion as a function of time. In this simulation, no (0%) TFD is applied and no (0 volts) supplemental resonant dipole potential is applied. There is neither a nonlinear resonance at $\beta_y$=⅔ nor a supplemental resonance potential. Therefore, the ion is ejected at $\beta_y$=1 by instability. FIG. 15B shows the ion ejection at $\beta_y$=⅔ due only to a supplemental dipole resonant potential of 20 volts (no TFD is applied). A much larger voltage is required since there is no nonlinear resonance in the trapping field to assist in the ejection. FIG. 15C shows that if the supplemental dipole resonant potential is reduced to 10 volts, no ejection occurs due to the dissipative effect of the collisions. By comparison, FIG. 15D shows that if a TFD of 30% is added, ion ejection occurs even at 10 volts of supplemental dipole resonant potential due to the formation of a strong nonlinear resonance at $\beta_y=2/3$.

It will be understood that apparatus and methods disclosed herein can be implemented in an MS system as generally described above. The present subject matter, however, is not limited to MS-based applications.

It will also be understood that apparatus and methods disclosed herein can be applied to tandem MS applications (MS/MS analysis) and multiple-MS ($MS^n$) applications. For instance, ions of a desired m/z range can be trapped and subjected to collisionally-induced dissociation (CID) by well known means using a suitable background gas (e.g., helium) for colliding with the "parent" ions. The resulting fragment or "daughter" ions can then be mass analyzed, and the process can be repeated for successive generations of ions. In addition to ejecting ions of unwanted m/z values and ejecting ions for detection, the resonant excitation methods disclosed herein may be used to facilitate CID by increasing the amplitude of ion oscillation.

It will also be understood that the alternating voltages applied in the embodiments disclosed herein are not limited to sinusoidal waveforms. Other periodic waveforms such as triangular (saw tooth) waves, square waves, and the like may be employed.

It will be further understood that various aspects or details of the invention may be changed without departing from the scope of the invention. Furthermore, the foregoing description is for the purpose of illustration only, and not for the purpose of limitation—the invention being defined by the claims.

What is claimed is:

1. A method for controlling ion motion comprising:

(a) generating an ion trapping field comprising a quadrupole component by applying a main AC potential to an electrode structure of linear ion trap, the electrode structure having a central axis and comprising a pair of opposing electrodes positioned along an axis orthogonal to the central axis of the electrode structure;

(b) applying an additional AC potential to the electrode pair to displace a central axis of the trapping field from a central axis of the electrode structure along the axis of the electrode pair;

(c) introducing a nonlinear resonance condition in the trapping field; and (d) applying a DC offset potential to the electrode pair to set the a-q operating point for the electrode structure to a point in a-q space where the nonlinear resonance condition can excite ion motion only along the axis of the electrode pair and substantially in a single direction along the axis of the electrode pair.

2. The method according to claim 1, wherein the main AC potential and the additional AC potential are applied at substantially the same frequencies.

3. The method according to claim 1, comprising increasing an amplitude of motion of an ion in the trapping field substantially along the axis of the electrode pair.

4. The method according to claim 1, comprising ejecting an ion from the trapping field substantially in the single direction along the axis of the electrode pair.

5. The method according to claim 4, wherein ejecting comprises scanning a parameter of a component for the trapping field to cause the ion to reach the operating point at which the nonlinear resonance condition is met for the ion.

6. The method according to claim 1, wherein applying the additional AC potential adds a trapping field dipole component to the trapping field that displaces the central axis of trapping field.

7. The method according to claim 6, wherein applying the additional AC potential further adds a multiple component to the trapping field that introduces the nonlinear resonance condition in the trapping field.

8. The method according to claim 7, wherein the multiple component comprises an odd-order multipole component.

9. The method according to claim 8, wherein the odd-order component comprises a hexapole component.

10. The method according to claim 1, comprising ejecting a plurality of ions of differing m/z values from the trapping field substantially in the same direction along the axis of the electrode pair.

11. The method according to claim 10, wherein ejecting comprises scanning a parameter of a component of the trapping field to cause the ions of differing m/z values to successively reach the operating point at which the nonlinear resonance condition is met for the ions.

12. The method according to claim 1, comprising applying a supplemental AC potential to the electrode pair to add a resonant dipole component to the trapping field, wherein the supplemental AC potential has a frequency matching a frequency corresponding to the nonlinear resonance condition.

13. The method according to claim 1, comprising ejecting a plurality of ions of differing m/z values from the trapping field by scanning the respective amplitudes of the main AC potential and the DC offset potential while maintaining the respective amplitudes at a constant ratio.

14. The method according to claim 1, comprising providing ions in an interior defined by the electrode structure subject to the trapping field.

15. The method according to claim 14, wherein providing ions comprises admitting ions into the interior substantially along the central axis of the electrode structure while the additional AC potential is applied, such that the ions are moved off the central axis of the electrode structure and constrained to oscillate about the displaced central axis of the trapping field.

16. The method according to claim 14, wherein providing ions comprises admitting ions into the interior before the additional AC potential is applied.

17. The method according to claim 14, wherein providing ions comprises admitting molecules into the interior and subsequently ionizing the molecules.

18. The method according to claim 14, comprising applying a multi-frequency waveform signal to the electrode structure, wherein the waveform signal has a frequency composition that causes ions of undesired m/z values to be resonantly ejected from the electrode structure.

19. The method according to claim 1, wherein the electrode structure is segmented along its central axis into a front section, a center section and a rear section, the main AC potential is applied to the front section, the center section and the rear section, and the additional AC potential is applied to at least the center section.

20. The method according to claim 19, wherein the DC offset potential is applied to the electrode pair at the front section, the center section, and the rear section.

21. The method according to claim 19, comprising providing ions in an interior defined by the electrode structure subject to the trapping field, and subsequently applying the additional AC potential to the front and rear sections to displace the central axis of the trapping field uniformly in the front, center and rear sections.

22. The method according to claim 1, wherein the point in a-q space to which the operating point is set is located on $\beta_y=2/3$, where y corresponds to the axis of the electrode pair.

23. A linear ion trap apparatus comprising:

(a) an electrode structure defining a structural volume elongated along a central axis of the electrode structure, and comprising a first pair of opposing electrodes disposed along a first axis radial to the central axis and a second pair of opposing electrodes disposed along a second axis radial to the central axis; and (b) means for applying a main AC potential to the electrode structure to generate an ion rapping field comprising a quadrupole component;

(c) means for applying an additional AC potential to the first electrode pair to displace a central axis of the tripping field along the first axis and establish a non-linear resonance condition in the trapping field; and (d) means for applying a DC potential to the first electrode pair to set of a-q operating point for the electrode structure to a point in a-q space where the nonlinear resonance condition can excite ion motion only along the first axis and substantially in a single direction along the first axis.

24. The apparatus according to claim 23, wherein the means for applying the additional AC potential adds a trapping field dipole to the trapping field having the same frequency as the main AC potential to displace the central axis of the trapping field.

25. The apparatus according to claim 24, wherein the means for applying the additional AC potential further adds a multipole component to the trapping field to establish the nonlinear resonance condition.

26. The apparatus according to claim 25, wherein the multipole component comprises an odd-order multipole component.

27. The apparatus according to claim 26, wherein the odd-order component comprises a hexapole components.

28. The apparatus according to claim 23, comprising means for applying an AC excitation potential to the first electrode pair having a frequency fulfilling the nonlinear resonance condition.

29. The apparatus according to claim 23, comprising means for ejecting all ions in range of m/z values substantially in the single direction along the first axis.

30. The apparatus according to claim 29 wherein the ejecting means comprises means for scanning a parameter of a component of the trapping field to cause the ions of differing m/z values to successively reach the operating point at which the nonlinear resonance condition is met for the ions.

31. The apparatus according to claims 23, comprising means for scanning the respective amplitudes of the main AC potential and the DC potential while maintaining the respective amplitudes at a constant ratio to eject a plurality of ions of differing m/z values from the trapping field.

32. The apparatus according to claim 23, wherein the electrode structure is segmented along its central axis into a front section, a center section, and a rear section.

33. The apparatus according to claim 23, wherein the point in a-q space to which the operating point is set is located on $\beta_y=2/3$, where y corresponds to the first axis.

* * * * *